United States Patent
Tung et al.

(10) Patent No.: US 9,116,731 B2
(45) Date of Patent: Aug. 25, 2015

(54) CLOUD REFERENCE MODEL FRAMEWORK

(75) Inventors: Teresa S. Tung, San Jose, CA (US);
Owen Richter, Santa Clara, CA (US);
Joseph F. Tobolski, Clarendon Hills, IL
(US); Kishore S. Swaminathan,
Willowbrook, IL (US)

(73) Assignee: Accenture Global Services Limited,
Dublin (IE)

( * ) Notice: Subject to any disclaimer, the term of this patent is extended or adjusted under 35 U.S.C. 154(b) by 1189 days.

(21) Appl. No.: 13/071,452

(22) Filed: Mar. 24, 2011

(65) Prior Publication Data

US 2011/0252420 A1 Oct. 13, 2011

Related U.S. Application Data

(60) Provisional application No. 61/321,780, filed on Apr. 7, 2010.

(51) Int. Cl.
*G06F 9/455* (2006.01)
*G06F 9/50* (2006.01)

(52) U.S. Cl.
CPC .......... *G06F 9/45533* (2013.01); *G06F 9/5072* (2013.01)

(58) Field of Classification Search
None
See application file for complete search history.

(56) References Cited

U.S. PATENT DOCUMENTS

| 7,668,703 | B1 | 2/2010 | Rolia et al. |
| 7,987,289 | B2 * | 7/2011 | Mason et al. ................. 709/242 |
| 8,498,997 | B2 * | 7/2013 | Murase ....................... 707/764 |
| 2006/0153090 | A1 | 7/2006 | Bishop et al. |
| 2008/0244233 | A1 | 10/2008 | Wilson et al. |
| 2011/0161400 | A1 * | 6/2011 | Silyaev et al. ................ 709/203 |
| 2011/0166952 | A1 | 7/2011 | Manchikanti et al. |
| 2012/0072581 | A1 | 3/2012 | Tung et al. |

* cited by examiner

*Primary Examiner* — Eric C Wai
(74) *Attorney, Agent, or Firm* — Fish & Richardson P.C.

(57) ABSTRACT

A computing device implemented method, in one embodiment, can include a cloud transformation module transforming content for a compute platform. Additionally, the method can include a cloud control module receiving the content from the cloud transformation module. The method can also include the cloud control module provisioning a virtual machine appliance to form the compute platform. Furthermore, the method can include a cloud instantiation module executing the provisioning of the cloud control module. In addition, the method can include a cloud appliance module adding middleware to a virtual machine to create the virtual machine appliance. Moreover, the method can include a cloud virtualization module producing a virtualized representation of the compute platform.

23 Claims, 18 Drawing Sheets

| Abstraction Layer | Security 416 | Availability 418 | Cost 420 | Performance 422 |
|---|---|---|---|---|
| Application 402 | User profile and permissions | User demand | User demand | User demand |
| Transformation 404 | Encryption Anonymization | Error Correction Codes | Multi-tenant | Data format Code optimization |
| Control 406 | Geography and vendor selection | Sale across data center regions | Assignment Where? How many? | Over the platform |
| Instantiation 408 | Port settings Network config. | Automated re-provisioning | Interconnection Network, provider | Network congestion |
| Appliance 410 | Antivirus software | Load-balancing Data, job replication | Capacity of middleware SW | Per appliance implementation |
| Virtual 412 | Physically isolated deployment of VWs | VM deployment policy Failover, cluster size | VM deployment Ratio to physical | VM CPUs memory, tops |
| Physical 414 | Physical access | Implementation: RAID, failover | Per equipment cost (kW) | Capacity: CPUs, memory, bps |

| Abstraction Layer | Implementation 816 | Availability 818 | Associated Cost 820 |
|---|---|---|---|
| Application 802 | On 24x7 | 99.999 | $260/month assuming 2 users |
| Transformation 804 | Job Replication | 99.999 | $130/user |
| Control 806 | Scale across 2 regions | 99.999 | $120/Platform that supports a fixed SLA |
| Instantiation 808 | Automated re-provisioning | 99.99 | $60/Instance |
| Appliance 810 | Load-balancing | 99.99 | $50/Appliance |
| Virtual 812 | No VM isolation | 99.99 | $40/VM |
| Physical 814 | RAID, failover | 99.9 | $40/Machine |

800

FIG. 8

CLOUD REFERENCE MODEL FRAMEWORK

CROSS REFERENCE TO RELATED APPLICATIONS

This application claims the benefit of U.S. Provisional Patent Application No. 61/321,780, filed Apr. 7, 2010, entitled "Cloud Reference Model Framework," by Teresa S. Tung et al., which is hereby incorporated by reference.

BACKGROUND

Cloud computing is appealing to most enterprises because of its promise of commodity and on-demand utility computing. However, cloud computing faces key barriers to adoption. For example, key policy issue barriers can include legal, indemnity, and compliance. In addition, key technology issue barriers can involve security, reliability, and performance. Furthermore, what makes navigating these issues difficult is that cloud-based application architecture is confusing. First, the term "cloud" is overloaded and used by many vendors each with vastly differing offerings. Second, the on-demand and scalability features of cloud computing are new and architects are still working to understand how to leverage these capabilities.

SUMMARY

A computing device implemented method, in one embodiment, can include a cloud transformation module transforming content for a compute platform. Additionally, the method can include a cloud control module receiving the content from the cloud transformation module. The method can also include the cloud control module provisioning a virtual machine appliance to form the compute platform. Furthermore, the method can include a cloud instantiation module executing the provisioning of the cloud control module. In addition, the method can include a cloud appliance module adding middleware to a virtual machine to create the virtual machine appliance. Moreover, the method can include a cloud virtualization module producing a virtualized representation of the compute platform.

In an embodiment, the method described above can further include a cloud application module for capturing user generated content and data associated with an application program. Furthermore, in one embodiment, the method described above can further include a physical module for providing raw compute, storage, and network capabilities.

While particular embodiments in accordance with the disclosure have been specifically described within this Summary, it is noted that the disclosure and the claimed subject matter are not limited in any way by these embodiments.

BRIEF DESCRIPTION OF THE DRAWINGS

Within the accompanying drawings, various embodiments in accordance with the disclosure are illustrated by way of example and not by way of limitation. It is noted that like reference numerals denote similar elements throughout the drawings.

FIG. 4 is a cloud reference model illustrating how per-layer functionality can be enumerated in accordance with various embodiments of the disclosure.

FIG. 8 illustrates a cloud reference model that includes attributes resulting from a specified implementation in accordance with an embodiment of the disclosure.

DETAILED DESCRIPTION

Reference will now be made in detail to various embodiments in accordance with the disclosure, examples of which are illustrated in the accompanying drawings. While the disclosure will be described in conjunction with various embodiments, it will be understood that these various embodiments are not intended to limit the disclosure. On the contrary, the disclosure is intended to cover alternatives, modifications and equivalents, which may be included within the scope of the disclosure. Furthermore, in the following detailed description of various embodiments in accordance with the disclosure, numerous specific details are set forth in order to provide a thorough understanding of the disclosure. However, it will be evident to one of ordinary skill in the art that the disclosure may be practiced without these specific details. In other instances, well known methods, procedures, components, and circuits have not been described in detail as not to unnecessarily obscure aspects of the disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities can take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It is noted that in one embodiment in accordance with the disclosure, a general description of "cloud" is a collection of network-hosted services accessible from almost anywhere with the following attributes: elastically scalable, illusion of infinite capacity, available on-demand, and consumption-based charges with no upfront commitment, but is not limited to such. This description can apply to all levels of the cloud (e.g., process, software application, compute platform, or virtual machine hosting).

Figure 1:
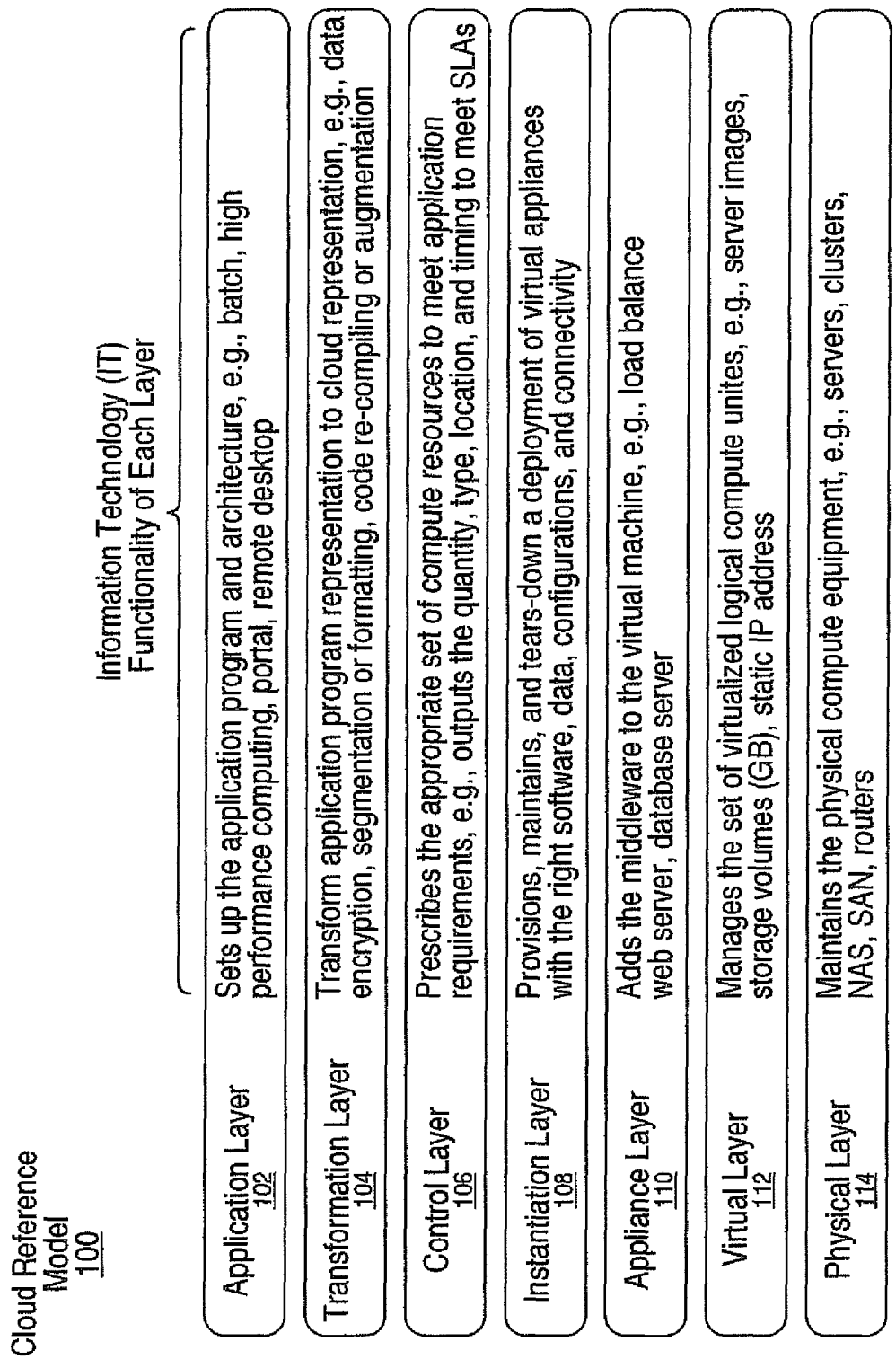
FIG. 1 is a cloud reference model or system in accordance with various embodiments of the disclosure.

FIG. 1 is a cloud reference model or system 100 in accordance with various embodiments of the disclosure. The cloud reference system 100 can divides cloud-based application architecture into multiple layers. For example, the cloud reference system 100 can include, but is not limited to, a cloud application layer 102, a cloud transformation layer 104, a cloud control layer 106, a cloud instantiation layer 108, a cloud appliance layer 110, a cloud virtual layer 112, and a cloud physical layer 114. Within the present embodiment, each layer can be a set of information technology (IT) functions that deliver conceptually similar services within part of the overall architecture. In addition, each layer focuses IT functionality on supporting a specific area of concern and abstracts details of other layers. In one embodiment, the functions of each layer interface directly with those of adjacent layers. Within the cloud reference system 100, details of other layers are decoupled and abstracted to separate concerns; each layer focuses on ensuring its set of services.

Note that in an embodiment, the cloud application layer 102, cloud transformation layer 104, cloud control layer 106, cloud instantiation layer 108, cloud appliance layer 110, cloud virtual layer 112, and cloud physical layer 114 can also be referred to as the cloud application module 102, cloud transformation module 104, cloud control module 106, cloud instantiation module 108, cloud appliance module 110, cloud virtual module 112, and cloud physical module 114, respectively, but are not limited to such.

In one embodiment, the application architecture design of the cloud reference model 100 can involve determining the functionality at each layer, such as, fulfilling requirements on attributes like security, reliability, and cost. The cloud reference model 100 fits together vendor offerings and do-it-yourself solutions based on addressing per layer functionality. Leveraging this approach may decouple the design and assessment of cloud-based IT systems to fulfilling per-layer functionality and then combining the per-layer functionality.

Within FIG. 1, in one embodiment, the Cloud Reference Model 100 can describe the functionality that may be considered as part of a cloud-enabled application architecture stack. It is pointed out that this Cloud Reference Model 100 groups IT functionality into layers to separate areas of concern.

The Cloud Reference Model 100 can be used to breakdown how an application's technology and policy needs are evaluated by narrowing the focus: At each layer solutions focus on realizing a subset of the needed IT functionality and assume other functionality as given—how to characterize attributes including functional, risk, reliability, security, and cost is decoupled. For example, security encompasses solutions from access to encryption to network protections to physical concerns; the Cloud Reference Model 100 decouples these decisions into what needs to be place at each layer (e.g., Application layer 102, Transformation layer 104, Control layer 106, Instantiation layer 108, Appliance layer 110, Virtual layer 112, and Physical layer 114). Or, cost requirements include adding up the costs of implementing the chosen solution from each layer. It is noted that fulfilling these needs can be an operation in mapping vendor offerings and do-it-yourself responsibilities.

Moreover, the Cloud Reference Model 100 is defined such that per-layer focus solutions interface with those of adjacent layers. Thus, the layer's boundaries delineate the cross-layer interfaces between solutions. Capability in a layer can be described in terms of services from the layer below it. For example, a virtual machine in the Virtual Layer 112 is a unit of compute resource carved from a physical server of the Physical Layer 114.

Note that in one embodiment, the per-layer needs of the Cloud Reference Model 100 can be fulfilled by combining together functionality from the adjacent layers with intra-layer vendor offerings and responsibilities provided by the Cloud Reference Model 100. Solutions at each layer are reusable, and properly combining the solutions can create an overall cloud architecture for applications like portals, batch, and distributed file systems. The Cloud Reference Model 100 can characterize the interactions and contributions of existing vendors and identifies the gaps.

Within FIG. 1, since the Cloud Reference Model 100 decouples IT functions, the chosen implementation at each layer is independent of the implementation of the underlying layers. After per-layer implementation is established or fixed, the Cloud Reference Model 100 can provide the framework for combining how these mechanisms interact to fulfill a composite service level agreement (SLA), capability, or concern. For example, the Appliance Layer 110 may only need to know the virtual machine specifications like central processor unit (CPU), memory, and disk; the details around how physical compute resources provide this capability is not required and may in fact be met in a number of different ways (e.g., via a server, via a number of blade servers, via a mainframe, via a desktop computer).

The cloud reference model 100 can provide a framework on top of which formulating composite application attributes like cost, availability, performance, and carbon footprint are a matter of defining how they are computed at each layer and then how they impact adjacent layers. Note that this methodology can decouple the computation.

Within FIG. 1, the Application Layer 102 can set up a cloud application program. User-generated content like code, data, static files, and executables can specify the application program. The content format and representation determine the needed application architecture. For example, a portal can be specified with HyperText Markup Language (HTML) files, images, and JavaScripts which determine a Java-based web application architecture. Other example architectures include batch processing or high performance computing. Content at the Application Layer 102 can specify the overall application functionality and include the end-user experience. The Application Layer 102 can supply the user demand and inputs the content to create the business application, but is not limited to such.

The Transformation Layer 104 can select the compute platform that meets the specifications of the generic application, and then maps the content and metadata from the Application Layer 102 to the required format for storage or execution on the selected compute platform. Example transformations applied to data by the Transformation Layer 104 can include, but are not limited to, encrypting, encoding for error correction, segmenting large data objects into smaller units, reformatting data structures into XML (Extensible Markup Language), or applying business logic to structure data. Likewise, example transformations applied to code by the Transformation Layer 104 can include, but are not limited to, recompiling, translating into a different language, or augmenting with additional code. The Transformation Layer 104 processing can complete the program for execution on the selected specific compute environment or platform. The Transformation Layer 104 can provide the mechanism or function to translate user content from the Application Layer 102 to the platform-specific code and user-data consumed by the platform created by the Control Layer 106.

Within FIG. 1, the Control Layer 106 can prescribe the best or appropriate set of a vendor's virtual machine appliances or pre-packed vendor services required to form the desired compute platform. Sourcing may account for vendor or geographical preferences. It is noted that the Control Layer 106 can determine the quantity, type, vendor, and location of virtual appliances to create the desired compute platform. More than one-time provisioning, the Control Layer 106 can monitor the current status of the compute platform and determine how and when to scale the compute platform to meet guarantees around, but not limited to, service level agreements (SLAs), compliance, cost, and/or capability. The Control Layer 106 can assign the formatted content from the Transformation Layer 104 across the prescribed deployment.

For example, the Control Layer 106 can prescribe that the portal source three web server nodes on Amazon's Elastic Compute Cloud (EC2) in the west coast region and three redundant nodes in the corporate data center; later based on monitoring of the actual performance, the Control Layer 106 can update the requirement to five worker nodes in both EC2 and the data center. It is pointed out that instead of a set of virtual machine appliances, the Control Layer 106 may include or prescribe a pre-packaged vendor service like Amazon Simple Storage Service (S3). In one embodiment, the Control Layer 106 ultimately determines how the compute platform is fulfilled. The Control Layer 106 can specify the sourcing and scaling of resources required to create the compute platform needed to process the compute and data passed by the Transformation Layer 104.

Within FIG. 1, the Instantiation Layer 108 can execute the specification of the Control Layer 106, e.g., automation of scripts provision, maintain, and tear-down the prescribed deployment of virtual appliances. As part of provisioning, the scripts can add the assigned content, software, data, configurations, and connectivity to form the application platform. For example, the provisioning by the Instantiation Layer 108 can apply the Internet Protocol (IP) address and update the Domain Name System (DNS). Working with the Control Layer 106, the Instantiation Layer 108 can pass monitored statistics and then implements the updates when sourcing arrangements are recomputed by the Control Layer 106. The Instantiation Layer 108 can enact how provisioning and configuration occurs specific to the infrastructure provider (e.g., data center, EC2, or GoGrid). The Instantiation Layer 108 can act upon the direction of the Control Layer 106 and set-up artifacts in the Appliance Layer 110, but is not limited to such.

The Appliance Layer 110 can contain the middleware added to a virtual machine to create a virtual machine appliance. The actual implementation of each appliance may vary so long as the appliance supports the prepared content. For example, software for Linux operation system, Apache HTTP (HyperText Transfer Protocol) server, MySQL database, and Python scripting language forms an appliance with the LAMP solution stack. The Appliance Layer 110 can create the images and templates of the specific appliance used in the compute platform. The Appliance Layer 110 can add the capability that augments the generic virtual compute capability from the Virtualization Layer 112, but it not limited to such.

The Virtualization Layer 112 can produce the virtualized representation of the compute resources. It is noted that management software at the Virtualization Layer 112 can handle the virtualization management of server images, generic storage volumes, and logical network connections. For example in an embodiment, VMware virtualization management software that is part of the Virtualization Layer 112 can monitor and assign virtual machines to physical resources. The Virtualization Layer 112 can assign or designate virtual compute, storage, and communication network units from the Physical Layer 114, but is not limited to such.

Within FIG. 1, in one embodiment, the Physical Layer 114 can maintain the physical devices that perform the compute operations. Note that the Physical Layer 114 can include, but is not limited to, the IT hardware for compute (e.g., servers, mainframes), storage (e.g., Storage Area Network (SAN), network-attached storage (NAS)), networks (e.g., routers, links), as well as the data centers that house this capability. Functions at the Physical Layer 114 can include data center services such as, handling RAID (Redundant Array of Independent Disks or Redundant Array of Inexpensive Disks) on storage, redundant failover of physical servers, physical network management, but is not limited to such. Note that the Physical Layer 114 can offer raw compute, storage, and network capability, but is not limited to such.

The 7-layers within the present embodiment of the Cloud Reference Model 100 describe a separation of functionality for cloud architectures to maximize solution compatibility. In one embodiment, the application program and the implementation of platform interfaces can occur at separate layers.

It is noted that in various embodiments, a Cloud Reference Model as described herein can be utilized in combination with compute resources and/or compute platforms. In one embodiment, a computer resource or a computer platform can include, but is not limited to, hardware, virtual hardware, compute servers, network routers, network switches, storage, databases, virtual networks, virtual servers, virtual storage, or any combination thereof.

Figure 2:
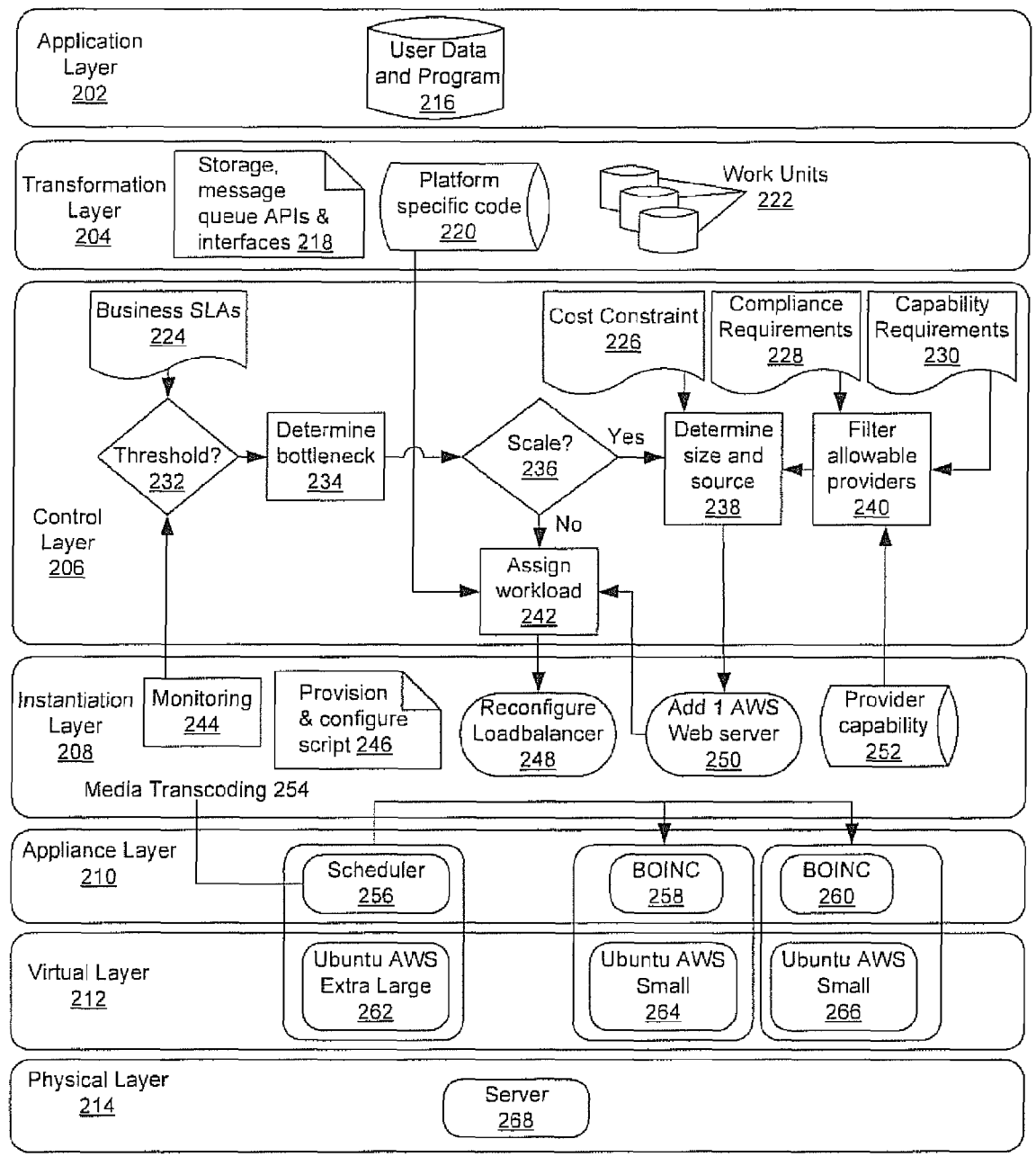
FIG. 2 includes an example that can be use to illustrate the components of layers of a Cloud Reference Model in accordance with various embodiments of the disclosure.

FIG. 2 includes an example that can be use to illustrate the components of layers of a Cloud Reference Model 200 in accordance with various embodiments of the disclosure. Consider media transcoding where users input data files of one format and the application outputs the files in a different format with added metadata for indexing search. Typical of batch jobs, this application executes the same processing steps over a large set of data which lends itself to scaling data processing across multiple machines for faster turnaround. Also the application use is irregular and can be setup for use and then deconstructed. FIG. 2 shows how the cloud reference model 200 breaks down the architecture components of this example in a way that decouples per-layer complexity from non-adjacent layers. It is noted that in one embodiment, an application layer 202, transformation layer 204, control layer 206, instantiation layer 208, appliance layer 210, virtual layer 212, and physical layer 214 of FIG. 2 can be an implementation of the application layer 102, transformation layer 104, control layer 106, instantiation layer 108, appliance layer 110, virtual layer 112, and physical layer 114, respectively, of FIG. 1.

At operation 216, the Application Layer 202 can contain the code that transcodes each file and the code that creates the end-user interface for accepting the commands and presenting the data files. Programmers can manipulate this code base focusing on interactions with the end-user and on interfaces with application programming interfaces (APIs) from the Transformation Layer 204 with minimal concern for the underlying compute platform.

At operation 220 of FIG. 2, next the Transformation Layer 204 transforms the code and collected data to suit the compute platform. In an embodiment where Amazon provides the platform for storage and message queue (as represented by 218), these transformations handle the details of the Application Layer 202's "put" and "get" instructions specific to the underlying Amazon interface: the code with APIs for Simple Queue Service (SQS) to log status and with Simple Storage Service (S3) to access the files, and the data with handling for storage in S3. For example, the Transformation Layer 204 breaks a data object into smaller pieces for storage on the cloud (as represented by work units 222), and upon retrieval the Transformation Layer 204 recombines and checks the object before presentation to the Application Layer 202. Changing the compute platform from Amazon can involve updates to "put" and "get" implementations.

At this point, it can be assumed that the lower layer implementation of the message queue and file storage are handled by vendor solutions SQS and S3, respectively. As such, the vendor (e.g., Amazon) is responsible for fulfilling all functionality at the lower layers. In return, Amazon's guarantees are accepted for this functionality: 99.9% availability and no latency guarantees. What remains is to complete the platform to handle the processing prepared in the Transformation Layer 204.

Within the Control Layer 206 of FIG. 2, controller logic determines the number and location of the virtual appliances needed to service the compute prepared by the Transformation Layer 204. Logic of the control layer 206 can filter at operation 240 the provided appliances based on, for example, capability to provide desired service and constraints like remaining within the country or the data center. Then the logic of the control layer 206 can select the appropriate number and type of appliances based on preferences and to meet desired guarantees, e.g., requires five large images to meet a time constraint of 24 hours, and locate in Amazon's west coast region to be physically close to the data stored on S3. With the help of constant monitoring at operation 244 from the Instantiation Layer 208, algorithms of the control layer 206 can assign the files to be processed, scale the number of virtual appliances, and re-assign files in case of delay or failure to meet time constraints. For example, if the processing is taking longer than expected, the logic of the control layer 206 signals that an additional virtual appliance is required. By implementing the logic at the Control Layer 206, there may be control over the placement of the compute as well as the time constraint and availability.

Based on the determination of the Control Layer 206, the Instantiation Layer 208 at operation 246 can automate the appropriate scripts to provision the appliances, connect the resulting appliances, and turn-off machines when finished. For example, for Amazon's Elastic Compute Cloud (EC2), provisioning scripts may supply particular Amazon credentials, apply configuration, load the content, and perform error handling if the returned appliance is faulty (e.g., memory errors).

Within FIG. 2, the Instantiation Layer 208 can use a script that installs a pre-defined image of the appliances. In one embodiment, the Appliance Layer 210 may create the image. In an embodiment, the Appliance Layer 210 can create an Amazon EC2 machine image for a job scheduler 256 appliance by installing the Berkeley Open Infrastructure for Network Computing (BOINC) control process software 258 and 260 to choreograph and distribute the files for a worker appliance using the BOINC client software that runs the media transcoding program 254.

Finally sticking to the Amazon example, Xen virtualization software may carve the virtual machine from the physical resources at the Virtualization Layer 212. For example within the present embodiment, the virtual layer 212 carves an extra large Ubuntu AWS virtual server 262 that operates in combination with the scheduler 256 of the appliance layer 210. In addition, the virtual layer 212 carves a small Ubuntu AWS virtual server 264 that operates in combination with the BOINC 258 of the appliance layer 210. Moreover, the virtual layer 212 carves a small Ubuntu AWS virtual server 266 that operates in combination with the BOINC 260 of the appliance layer 210. It is noted that in one embodiment, the responsibility of the virtual layer 212 is to ensure the virtual machines' health, e.g., receiving adequate Central Processing Unit (CPU) and memory shares. And the Physical Layer 214, which can include one or more servers 268, deals with data center concerns of supplying power, cooling, compute to support the virtual machines.

At each layer of the Cloud Reference Model 200, the IT functions focus on functions supporting one level of abstraction. As such, solutions focus on supporting the component at just their layer with minimal concern for other details. Then modifications like changing cloud providers at the virtual machine or compute platform level involves updates to these interfaces. As such, per-layer solutions are reused minimizing re-architecting, and combining the solutions forms the overall cloud architecture.

At operation 224 of FIG. 2, it is noted that the cloud control layer 206 can receive business service level agreements (SLAs). Operation 224 can be implemented in a wide variety of ways. For example in one embodiment, the business service level agreements can be received by the cloud control layer 206 at operation 224 from a user interface of a computing device or system. In an embodiment, the business service level agreements can be read in at operation 224 from a file from a configuration management database. Note that operation 224 can be implemented in any manner similar to that described herein, but is not limited to such.

At operation 244, the cloud Instantiation Layer 208 can continuously monitor one or more service providers (or vendors) based on the received business service level agreements and then pass or send those monitored statistics to the control layer 206. Note that operation 244 can be implemented in a wide variety of ways. For example, operation 244 can be implemented in any manner similar to that described herein, but is not limited to such.

At operation 232 of FIG. 2, the cloud control layer 206 can determine whether each of the monitored statistics of the service level agreements is satisfying their corresponding defined threshold. If each threshold is satisfied, no action is taken at operation 232 by the cloud control layer 206. However, if it is determined at operation 232 that one or more thresholds are not satisfied, the cloud control layer 206 can proceed to operation 234. It is pointed out that operation 232 can be implemented in a wide variety of ways. For example, operation 232 can be implemented in any manner similar to that described herein, but is not limited to such.

At operation 234, the cloud control layer 206 can determine the bottleneck (or obstacle) causing the one or more service level agreements to not satisfy their corresponding defined threshold. It is noted that operation 234 can be implemented in a wide variety of ways. For example in an embodiment, the determination at operation 234 can include analyzing the received monitored statistics to identify one or more virtual machine appliances and/or worker nodes that are causing the bottleneck, but is not limited to such. Operation 234 can be implemented in any manner similar to that described herein, but is not limited to such.

At operation 236 of FIG. 2, the cloud control layer 206 can determine whether scaling the compute platform capacity will potentially eliminate the one or more bottlenecks determined at operation 234. If so, the cloud control layer 206 can proceed to operation 238. However, if it is determined at operation 236 that scaling the compute platform capacity will not eliminate the one or more bottlenecks, the cloud control layer 206 can proceed to operation 242. Note that operation 236 can be implemented in a wide variety of ways. For example, operation 236 can be implemented in any manner similar to that described herein, but is not limited to such.

At operation 220, the cloud transformation layer 204 can receive and transform code and data, which are then transmitted by the cloud transformation layer 204 to the cloud control layer 206. It is pointed out that operation 220 can be implemented in a wide variety of ways. For example, operation 220 can be implemented in any manner similar to that described herein, but is not limited to such.

At operation 242 of FIG. 2, the cloud control layer 206 utilizes the transformed code and data together with sizing and sourcing information in order to assign workload across the prescribed deployment. In addition, the cloud control layer 206 can transmit at operation 242 the workload assignment information to the cloud instantiation layer 208. It is noted that operation 242 can be implemented in a wide variety of ways. For example, operation 242 can be implemented in any manner similar to that described herein, but is not limited to such.

At operation 248, after receiving the workload assignment information from the cloud control layer 206, the cloud instantiation layer 208 can distribute the workload across the prescribed deployment (e.g., reconfigure a load balancer as shown). Furthermore, as part of the workload distribution at operation 248, the cloud instantiation layer 208 can provision and configure script 246 in order to distribute the workload across the prescribed deployment. It is pointed out that operation 248 can be implemented in a wide variety of ways. For example, operation 248 can be implemented in any manner similar to that described herein, but is not limited to such.

At operation 226 of FIG. 2, the cloud control layer 206 can receive one or more cost constraints for service providers or vendors. It is noted that operation 226 can be implemented in a wide variety of ways. For example in one embodiment, the one or more cost constraints for service providers can be received by the cloud control layer 206 at operation 226 from a user interface of a computing device or system. In an embodiment, the business service level agreements can be read in at operation 224 from a file from the configuration management database. Note that operation 226 can be implemented in any manner similar to that described herein, but is not limited to such.

At operation 228, the cloud control layer 206 can receive one or more compliance requirements for service providers or vendors. Note that operation 228 can be implemented in a wide variety of ways. For example in an embodiment, the one or more compliance requirements for service providers can be received by the cloud control layer 206 at operation 228 from a user interface of a computing device or system. In one embodiment, the compliance requirements can be read in at operation 228 from a file from the configuration management database. It is pointed out that operation 228 can be implemented in any manner similar to that described herein, but is not limited to such.

At operation 230 of FIG. 2, the cloud control layer 206 can receive one or more capability requirements for service providers or vendors. It is pointed out that operation 230 can be implemented in a wide variety of ways. For example in one embodiment, the one or more capability requirements for service providers can be received by the cloud control layer 206 at operation 230 from a user interface of a computing device or system. In one embodiment, the capability requirements can be read in at operation 228 from a file from the configuration management database. It is noted that operation 230 can be implemented in any manner similar to that described herein, but is not limited to such.

At operation 252, the cloud instantiation layer 208 can acquire and transmit capability information for one or more service providers to the cloud control layer 206. Note that operation 252 can be implemented in a wide variety of ways. For example, operation 252 can be implemented in any manner similar to that described herein, but is not limited to such.

At operation 240 of FIG. 2, the cloud control layer 206 can utilize the received compliance requirements for service providers, the received capability requirements for service providers, and the received capability information for one or more service providers in order to filter out allowable service providers that are able to satisfy the requirements. It is noted that operation 240 can be implemented in a wide variety of ways. For example, operation 240 can be implemented in any manner similar to that described herein, but is not limited to such.

At operation 238, in order to scale the compute platform capacity to potentially eliminate the one or more bottlenecks determined at operation 234, the cloud control layer 206 can utilize the received one or more cost constraints and the allowable service providers to determine sizing and sourcing from each service provider or vendor. Additionally, the cloud control layer 206 can transmit or output at operation 238 sizing and sourcing information to the cloud instantiation layer 208. It is pointed out that operation 238 can be implemented in a wide variety of ways. For example in one embodiment, the sizing and sourcing determination at operation 238 by the cloud control layer 204 can include the assignment of roles (e.g., primary and redundant, or worker and aggregator), but is not limited to such. In addition, the output of the cloud control layer 206 at operation 238 can be a number and type of virtual machine appliances from each vendor for the cloud instantiation layer 208 to provision, but is not limited to such. Furthermore, the output of the cloud control layer 206 at operation 238 may prescribe a vendor provided platform that serves the basic functionality, or the details of building the platform, or a number of virtual machine appliances that augment or replicate this basic functionality. Operation 238 can be implemented in any manner similar to that described herein, but is not limited to such.

At operation 250 of FIG. 2, after receiving the sizing and sourcing information from the cloud control layer 206, the cloud instantiation layer 208 can provision and configure script in order to implement the sizing and sourcing from each service provider or vendor (e.g., add one AWS web server as shown). Moreover, the cloud instantiation layer 208 at operation 250 can also output or transmit the received sizing and sourcing information to the cloud control layer 206 for use at operation 242. Note that operation 250 can be implemented in a wide variety of ways. For example, operation 250 can be implemented in any manner similar to that described herein, but is not limited to such.

It is pointed out that the Cloud Reference Model 100 of FIG. 1 may be used to evaluate information technology (IT) attributes for a cloud-based IT system. IT practitioners may need to evaluate system attributes including cost, carbon footprint, availability, performance, and security. Before cloud, the common practice mapped overall system attributes directly to the attributes of the dedicated IT hardware (i.e., the cost of the system is the cost of the hardware and so forth). The difficulty with cloud is that while a cloud-based system ultimately maps to hardware, the hardware may be owned by other entities and its composition is not visible; or the hardware is shared among many different applications; furthermore the composition of the hardware may vary over time. The Cloud Reference Model 100 can map the cloud-based application's IT stack tracing the system from application to hardware. This mapping may allow for the characterization of system attributes.

The layered structure of the Cloud Reference Model 100 can decouple the problem. The Cloud Reference Model 100 can focus per-layer functionality in terms of capability added to that delivered from the layer directly below it. This structure allows for per layer characterization of attributes in terms of metrics accumulated from the lower layers. For example, the cost at a given layer adds the cost of the component at that layer and to the accumulated to cost from the layer below. This approach enables the comparison of different solutions within a layer and characterization of combinations of solutions fit across layers.

Figure 3:
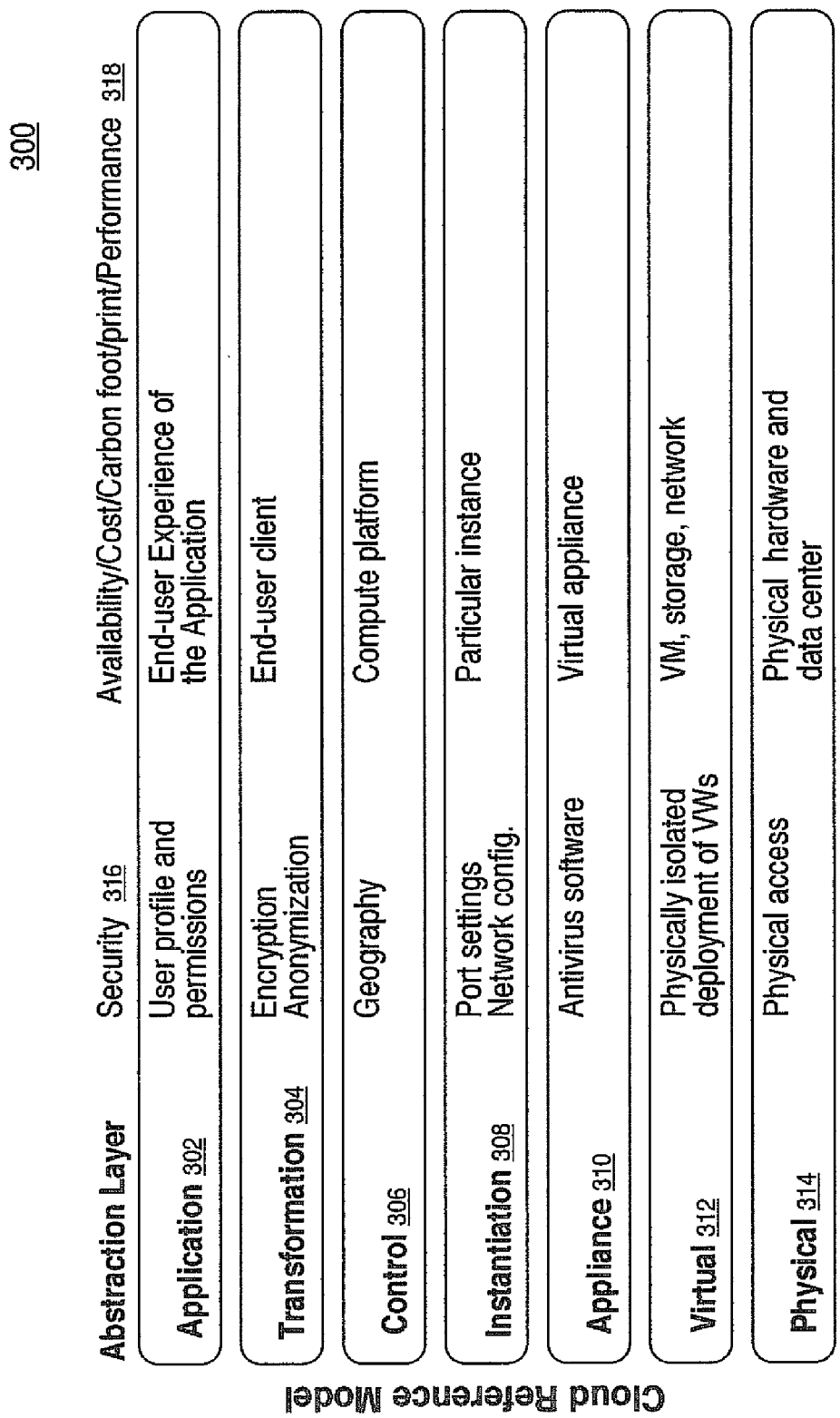
FIG. 3 illustrates utilizing a cloud reference model to characterize cloud system attributes in accordance with various embodiments of the disclosure.

FIG. 3 illustrates utilizing a cloud reference model 300 to characterize cloud system attributes in accordance with various embodiments of the disclosure. It is noted that for a given attribute, an IT practitioner (or a computing module) can map the per-layer instantiation of the attribute to a layer of the cloud reference model 300. Each layer focuses IT capability. In this first operation, the IT practitioner (or the computing module) can identify if and how the attribute applies to the capability of each layer of the cloud reference model 300.

Specifically, one way to utilize the cloud reference model 300 is to identify one or more attributes associated with each of its layers. Note that attributes can vary across layer based on the functionality within the layer of the cloud reference model 300. For example in one embodiment, the attributes may either 1) vary by focusing on a unique instantiation of the attribute, or 2) vary by focusing on how the per-layer instantiation combines with that of the lower layers.

More specifically, case 1 above can be illustrated via security 316, wherein security 316 characterizes different types of protections based on the functionality within a layer. In one embodiment, the Physical Layer 314 can consider the security of the hardware and physical data center. Furthermore, the Virtual Layer 312 can consider the security of the virtualization software on top of the physical costs. The Appliance Layer 310 can consider the security of the middleware to the cost per virtual machine/storage/network. The Instantiation Layer 308 can consider the security of the instantiation and configuration of the appliances. The Control Layer 306 can consider the security of the chosen geography and vendor in which the application is deployed. The Transformation Layer 304 can consider the transport and handling of the user data and content to the resulting compute platform. The Application Layer 302 can consider the security of the end user access.

Note that case 2 mentioned above can be illustrated via Availability/Cost/Carbon Footprint/Performance 318, wherein these attributes are characterized by how the per layer implementation acts with that of the layers below. In an embodiment, the cost of the Physical Layer 314 can be that of the hardware and physical data center. Additionally, the cost of Virtual Layer 312 can add virtualization software costs on top of the physical costs. The result is the cost per virtual machine/storage/network. The cost of the Appliance Layer 310 can add the cost of middleware to the cost per virtual machine/storage/network. The result is the cost per appliance. The cost of the Instantiation Layer 308 can add the cost to instantiate and configure the appliance/storage/network to the cumulative cost of the combination of virtual appliances needed. Note that an instance includes an inventory of virtual appliances configured with the right network and storage settings. The result at a given time is the cost of that inventory.

Within FIG. 3, the cost of the Control Layer 306 can accumulate the cost of the instances of the Instantiation Layer 308 over time. Recall that the inventory may vary over time based on the functionality of the Control Layer 306. For example, consider inventory A that consists of 2 small virtual appliances at US $0.10/hr and inventory B that consists of 4 small virtual appliances. The Control Layer 306 can track that inventory A is used for 1 hour and inventory B is used for 2 hours, thus the cost is US$1.00. Additionally, the Control Layer 306 may add cost to the software that monitors and computes the required platform. Similarly with Performance and Availability, the Control Layer 306 can track the performance and availability maintained over time, instead of a particular instance. For example, the performance of Inventory B is double that of Inventory A. However, at any time the minimum performance is that of Inventory A. The result of the Control Layer 306 is the attribute as associated with a platform. The Transformation Layer 304 can add costs associated with interfacing the end-user client to the platform created by the Control Layer 306. The result is the cost of the application setup. The Application Layer 302 can add costs associated with adding the user-specific data and content to the interface exposed by the Transformation Layer 304. The result is the cost of the application per use.

In one embodiment, after identifying the one or more attributes associated with each layer of the cloud reference model 300 of FIG. 3, per-layer functionality can be enumerated as shown in FIG. 4, but is not limited to such.

FIG. 4 is a cloud reference model 400 illustrating how per-layer functionality can be enumerated in accordance with various embodiments of the disclosure. For example in one embodiment, for a specified instantiation of the system, a per-layer functionality can be identified as it impacts the attribute described with reference to FIG. 3. Note that the cloud reference model 400 can identify the interfaces and the solutions that are to be met in the application architecture. Additionally, the combined per-layer implementations of the cloud reference model 400 results in an overall application. Each layer of the cloud reference model 400 can contribute to the overall design and combine to provide a composite guarantee.

The cloud reference model 400 provides an abstraction to decouple concerns. In addition, the cloud reference model 400 identifies the per-layer functionality that contributes to an attribute, e.g., security 416, availability 418, cost 420, and/or performance 422, but is not limited to such. Take security 416 as an example where each layer of the cloud reference model 400 presents different concerns. In one embodiment, security at the Physical Layer 414 regulates and secures the physical access to the hardware and data center. The Virtual Layer 412 isolates and guarantees virtual resources (e.g., machines and network). In addition, the Virtual Layer 412 secures the virtual compute, storage, or network units as managed by virtualization management software, e.g., whether virtual compute instances are physically isolated or share physical equipment with those of others. Antivirus, authentication, and firewall software installed within the appliance can provide protections at the Appliance Layer 410. Moreover, the Appliance Layer 410 can secure the virtual appliances via installation of antivirus software and application of the patches.

Within FIG. 4, the Instantiation Layer 408 can apply network port configurations to minimize intrusion, constantly monitor against compromise or network flooding, and signal the Control Layer 406 for updates when adverse conditions are detected. Furthermore, the Instantiation Layer 408 can secure the instantiation of the compute platform by applying the right configuration settings, e.g., closing unused network ports. Finally, the Transformation Layer 404 can secure the transportation and preparation of the client user data using encryption and anonymization of data, and the Application Layer 402 can handle end-user authentication and access. In addition, the Application Layer 402 secures access via user profile, permissions, and authentication. Note that each layer of the Cloud Reference Model 400 can add a different level of security protection. Furthermore, the separation of components makes it easier to describe and evaluate requirements.

Additionally, the cloud reference model 400 can provide a framework for compiling the various per-layer solutions to impact overall application guarantees as is the case with availability 418. In an embodiment, availability at the Physical Layer 418 can depend on the native availability of the physical compute machines and data centers, e.g., handling RAID (Redundant Array of Independent Disks or Redundant Array of Inexpensive Disks) on storage, redundant failover of physical servers, and physical network management, but is not limited to such. Note that higher available physical equipment at the Physical Layer 414 leads to better performance of the virtual resources (e.g., at the Virtual Layer 412). Using this base unit, either a higher available virtualized machine with the same number of physical machines can be offered or the same level of availability using fewer physical machines. Within the Virtual Layer 412, availability of virtualized resource offerings can be based on the policy implemented by virtualization software to carve out virtualized resources from physical resources (e.g., the cluster size of physical machines on which virtual machines are assigned). In addition, availability at the Virtual Layer 412 can include virtual machine (VM) deployment policy and redundant failover of virtual machines, but is not limited to such.

Within FIG. 4, the appliance middleware of the Appliance Layer 410 can add guarantees with capabilities for load-balancing, spawning redundant jobs, and replicating data. Furthermore, within the Appliance Layer 410, availability of the virtual appliances can depend on the ability of the middleware software to replicate or load balance data or job processes. Note that parallelization can improve the availability since there is no single point of failure. Instantiation Layer 408 scripts can check the health of provisioned machines and automatically re-provisions in the case of failures. In addition, within the Instantiation Layer 408, availability of the instance can depend on the software or processes specified for the monitoring and orchestrating the configuration of the appliances (e.g., software that automatically detects when an appliance goes down and automatically restarts it). Control logic of the Control Layer 406 can act on real-time monitoring to update the prescribed deployment with adequate backup capability. In addition, the Control Layer 406 can scale across data center regions. Moreover, within the Control Layer 406 availability of the compute platform can depend on the policies in place to source and scale the platform (e.g., an unreliable vendor decreases the availability of the application, or sourcing from two independent vendors improves the availability).

Within the Transformation Layer 404 availability of the client-end application can be improved by quality checking or pre/post-processing the user submitted content, e.g., error correction codes or redundant requests can also be generated at the Transformation Layer 404 when instantiated by the client. Within the Application Layer 402 availability of the resulting application can depend on the actual usage demanded, e.g., demand that overloads the system reduces the availability. As such, implementation at each layer of the cloud reference model 400 can contribute to the overall attributes of the application. It is pointed out that overall reliability can be met via more reliable lower layers or less reliable compensated by increased redundancy at the upper layers. The cloud reference model 400 can trace relationships across various components providing a structure for cascading computations for attributes like availability.

Within FIG. 4, the cloud reference model 400 can provide a framework for compiling the various per-layer solutions to impact overall application guarantees as is the case with cost 420. Within the Physical Layer 414, cost can include the cost to support the physical IT (e.g., per equipment cost (kW)). Within the Virtual Layer 412, cost of the virtual unit can be derived by adding the cost of virtualization software to the cost to support the physical equipment that runs the virtual units (e.g., if it costs $100/month to support the physical server and the virtual machine deployment ratio is 4 VMs per cluster, then it costs $20/month to support the physical equipment associated with 1 virtual machine). Within the Appliance Layer 410, cost of the appliance adds the middleware costs to the costs of the required virtual unit (e.g., a large virtual machine instance may cost $0.20/month compared to a small one that costs $0.10/month). The appliance itself has a capacity for which to advertise costs (e.g., capacities expressed as is 100 users, or 10,000 requests per hour, or 10 GB of storage may result in cost expressed as price per user, request, or amount of storage).

Within the Instantiation Layer 408, cost of the instance can add the orchestration software costs to the costs for I/O (e.g., reads and writes, network traffic, etc.) and to the costs for the underlying appliances. Within the Control Layer 406, it is noted that the cost of the compute platform can compound over time. In one embodiment, the policies of the Control Layer 406 describe at what level of utilization to run the appliances (e.g., 50% utilization of a 1,000 user max capacity appliance means that to satisfy 1000 users we would require 2 appliances). Within the Transformation Layer 404, cost can include the cost of the compute platform as it is shared over many accounts (e.g., 1 account may be multi-tenanted at the Transformation Layer 404 so the costs are divided by users). Within the Application Layer 402, cost of the actual use can be metered by demand at the Application Layer 402 (e.g., require on average 1,000 requests, or 20 users per month).

Within FIG. 4, the cloud reference model 400 can provide a framework for compiling the various per-layer solutions to impact overall application guarantees as is the case with performance 422. Within the Physical Layer 414, performance can include the performance of the underlying hardware. Within the Virtual Layer 412, performance can include the performance of virtual units carved out of the physical IT. Within the Appliance Layer 410, performance can include performance based on the middleware. It is noted that the appliance itself has a max capacity (e.g., capacities expressed as is 100 users, or 10,000 requests per hour, or 10 GB of storage). Within the Instantiation Layer 408, performance can include performance of the instance configured, e.g., the specific network settings and instance will result in different levels of congestion (e.g., 20 ms delay from San Jose to San Francisco or 200 ms delay from San Jose to Chicago).

Within the Control Layer 406, performance can include the performance of the compute platform and includes policies that scale the compute platform (e.g., a policy may suggest that appliances be run to utilize 50% of maximum capacity so that resulting performance will be improved). Within the Transformation Layer 404, it is noted that transformations of the user submitted content may improve performance (e.g., optimized compiling of the code may result in faster performance, or preprocessing of data may result in less storage used). Within the Application Layer 402, performance can be based on the user demand (e.g., user demand that saturates the system reduces performance).

Figure 5:
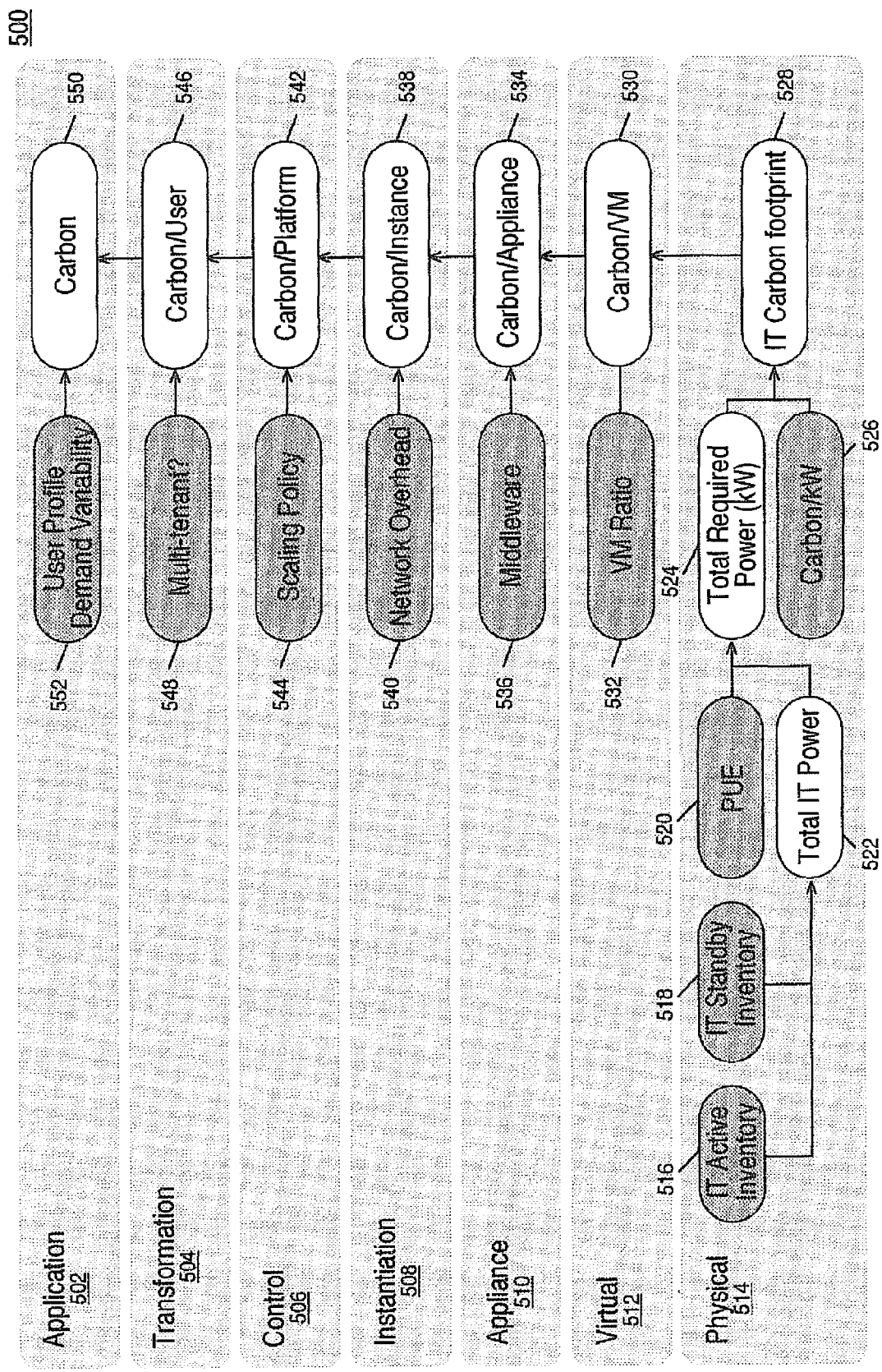
FIG. 5 illustrates utilizing a cloud reference model for performing an example carbon footprint computation in accordance with various embodiments of the disclosure.
Figure 6:
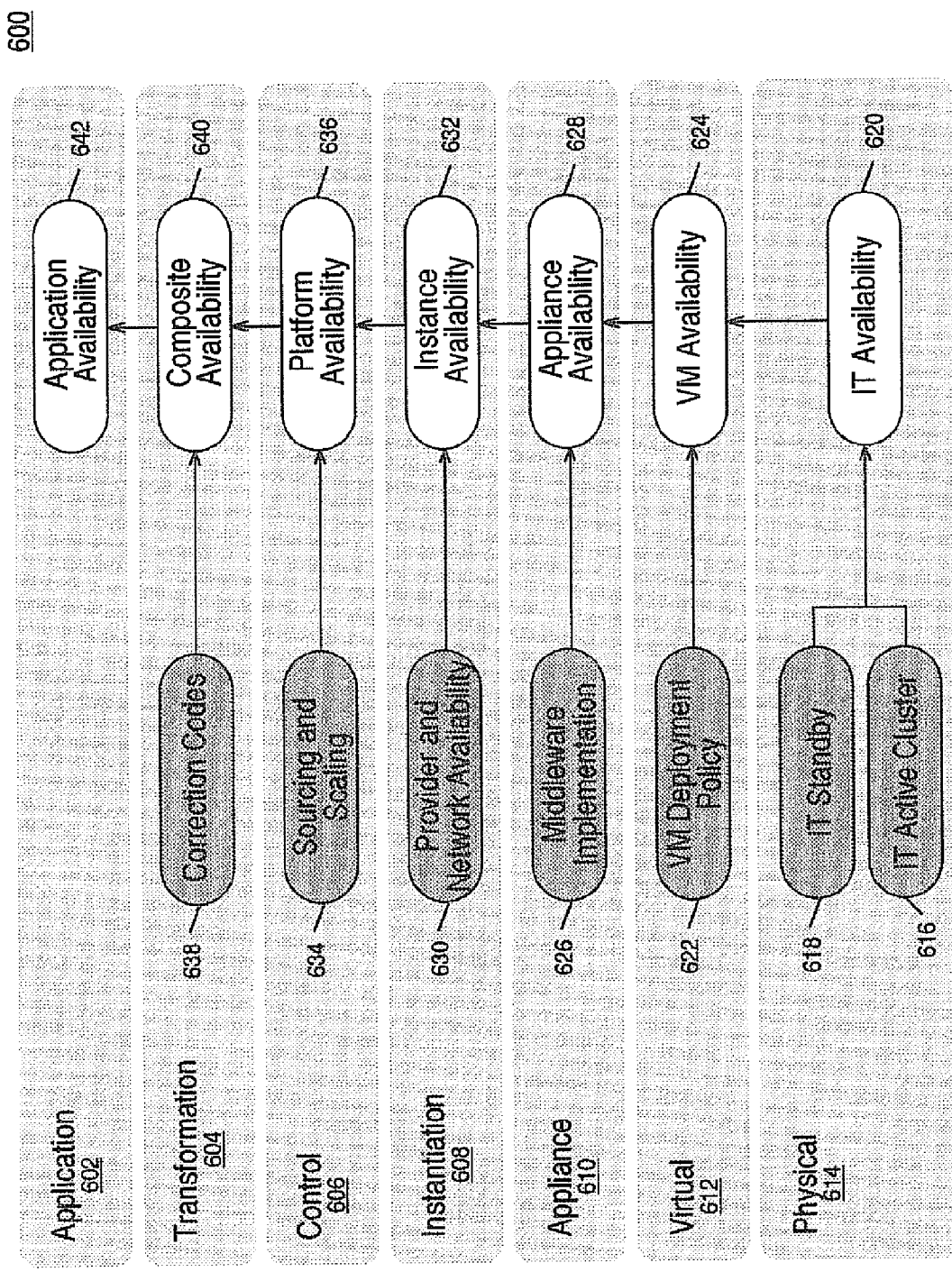
FIG. 6 illustrates utilizing a cloud reference model for performing an example availability computation in accordance with various embodiments of the disclosure.
Figure 7:
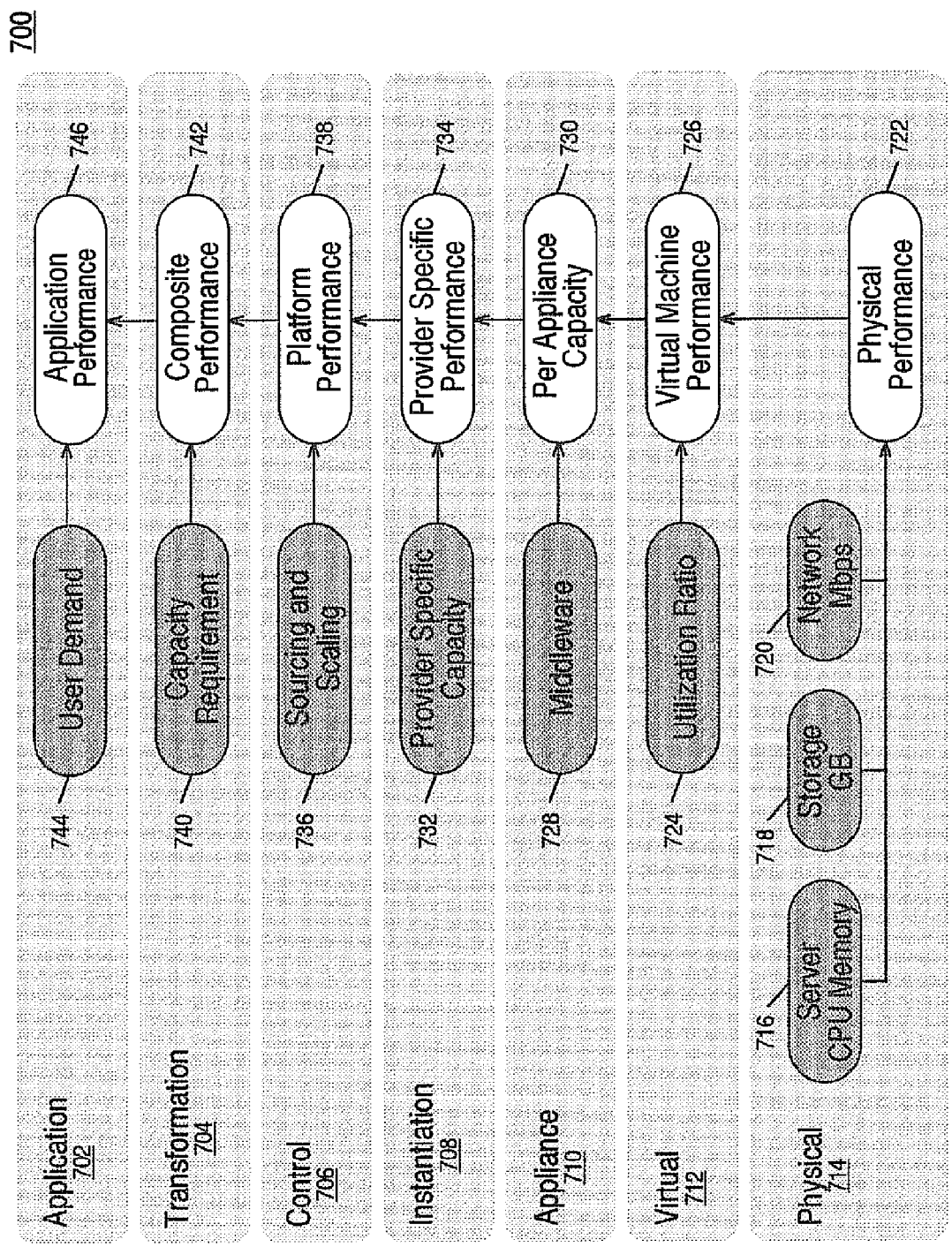
FIG. 7 illustrates utilizing a cloud reference model for performing an example performance computation in accordance with various embodiments of the disclosure.

In one embodiment, after enumerating the functionality of each layer of the cloud reference model 400 of FIG. 4, relationships can be traced across layers to characterize the cumulative impact of the combined system as it evolves across the layered stack as shown in FIGS. 5, 6, and 7, but is not limited to such. For example, for attributes with metrics, the structure of the cloud reference module (e.g., 500, 600, or 700) can be used to formulate metrics as functions of per-layer implementation and lower layer metrics. In one embodiment, attributes may consist of a satisfied/unsatisfied valuation at each layer, or an accumulated metric like cost. This operation allows for characterization of attributes for a system comprising of a combination of various providers within and across layers. Note that FIGS. 5, 6, and 7 each illustrates how to combine the per-layer instantiation to characterize sample attributes for the cloud based IT system.

FIG. 5 illustrates utilizing a cloud reference model 500 for performing an example carbon footprint computation in accordance with various embodiments of the disclosure. Specifically, the cloud reference model 500 is utilized to perform an example carbon footprint computation for estimating the amount of energy used (e.g., kilowatt hour (kWh)) by a cloud-based application in accordance with various embodiments. It is noted that the gray ovals within the cloud reference model 500 each represent an input while the white (non-grayed) ovals each present an output of the cloud reference model 500.

In the Physical Layer 514, the inventory of IT including IT active inventory equipment 516 and IT standby inventory equipment 518 draw a total amount of IT power (e.g., kW) 520. The energy drawn by the data center facility to deliver this power to the IT is captured by the PUE (Power Utilization Efficiency) ratio 522. Multiplying the total IT power 520 with the PUE 522 results in the total power required by the IT (e.g., kW) 524. Multiplying by the carbon/kW ratio 526 given by the power generation gives the carbon footprint of the IT 528.

Within FIG. 5, the Virtual Layer 512 carves this total IT power amongst various virtual systems. A ratio of the amount of virtual systems 532 carved from the physical system results in the power per virtual unit 530. For example, if the physical system supports 100 virtual machines, then dividing the carbon footprint of the system by 100 results in the power per virtual machine.

The Appliance Layer 510 adds middleware 536 that forms an appliance 534 from virtual resources. For example, if middleware uses just 1 virtual machine then the resulting appliance draws the same power as the virtual machine. Instead, if the appliance requires 3 virtual machines, the resulting power is that of 3 virtual machines. The carbon footprint of the appliance is that of 1 and 3 virtual machines, respectively.

Within FIG. 5, the Instantiation Layer 508 implements an instance of the appliance within a private or public data center. This instance includes network connections that also draw power (e.g., routers) and have a resulting carbon footprint. Also it captures the current state of the appliance for those that scale. For example, that at this current time, the appliance is the large appliance (e.g., that with 3 virtual machines instead of 1 in the Appliance Layer 510). Adding the network contribution 540 to the instance of the appliance results in the carbon of the instance 538.

The output from the Instantiation Layer 508 is the carbon use for a given instance. The Control Layer 506 specifies the sourcing of appliances executed by the Instantiation Layer 508 to form a platform 542. The specification of the Control Layer 506 may vary with time to meet demand and changing conditions (e.g., scaling policy) 544. The sum of the carbon of the appliances results in that of the platform 542 over a period of time. For example, an appliance of type A and B form the platform over month 1, and then 2 appliances of type A form the platform over month 2. The resulting carbon of the platform is that of type A for 3 months, and type B for 1 month.

Within FIG. 5, the Transformation Layer 504 divides the resulting carbon footprint of the platform with the capacity (e.g., specified in terms of users, jobs, or storage) 548 resulting in an output of carbon/user 546. For example, for a platform with a capacity of 10,000 users, its carbon footprint divided by 10,000 gives the carbon footprint of 1 user.

The Application Layer 502 drives the demand 552, e.g., 1000 users. The Application Layer 502 multiplies the demand 552 with the carbon/user 546 to give the overall footprint 550 for a given use case.

FIG. 6 illustrates utilizing a cloud reference model 600 for performing an example availability computation in accordance with various embodiments of the disclosure. Specifically, the cloud reference model 600 is utilized to perform an example availability computation for estimating the availability (e.g., percentage of time a system is up and available for use) for a cloud-based application in accordance with various embodiments. Note that the gray ovals within the cloud reference model 600 each represent an input while the white (non-grayed) ovals each present an output of the cloud reference model 600.

In the Physical Layer 614, the inventory of IT including IT active cluster equipment 616 and IT standby equipment result in a total IT availability 620. The deployment policy 622 of the Virtual Layer 612 results in an availability 624 of the virtual unit. For example, if all virtual machines share the same physical server, then the availability is that of the physical machine. Or, if the virtual machines can migrate on any one of 3 machine cluster, then as long as one of the machines is up.

Within FIG. 6, the Appliance Layer 610 adds middleware 626 that forms an appliance availability 628 from virtual resources. This middleware may add capability like load balancing or data duplication that improves the availability of the underlying virtual resources. For example, data duplication may mean that a volume of storage may be corrupted, but we can still recover from the remaining volumes. Load balancing may mean that a number of virtual machines may go down, but still function so long as a minimum number are working.

The Instantiation Layer 608 implements an instance of the appliance and includes network connections. Multiplying the availability of network contribution 630 to the instantiated appliance results in the availability of the instance 632. The output from the Instantiation Layer 608 is the availability for a given instance 632.

Within FIG. 6, the Control Layer 606 specifies the sourcing and scaling of appliances 634 executed by the Instantiation Layer 608 to form a platform availability 636. The specification of the Control Layer 606 may source a number of instances to meet a higher availability constraint. For example, two independent instances with 99.9% together provide 99.99% availability.

The Transformation Layer 604 may add preprocessing 638 that further enhances composite availability 640. For example, error correction codes mean that some fraction of data stored may be corrupted or lost while ensuring accurate recovery. Note that the Transformation Layer 604 outputs the composite availability 640 to the Application layer 602. It is pointed out that the Application Layer 602 output the application availability 642, which is equal to the composite availability 640.

FIG. 7 illustrates utilizing a cloud reference model 700 for performing an example performance computation in accordance with various embodiments of the disclosure. Specifically, the cloud reference model 700 is utilized to perform an example performance computation for estimating the performance for a cloud-based application in accordance with various embodiments. Similar to security evaluations, performance evaluations using the cloud reference model 700 focuses the discussion on what component is being delivered at each layer. It is noted that the gray ovals within the cloud reference model 700 each represent an input while the white (non-grayed) ovals each present an output of the cloud reference model 700.

At the Physical Layer 714, the configuration of IT equipment and facility (e.g., power and cooling) provide a composite amount of capability 722 (e.g., CPUs of compute 716, GB of storage 718, and Mbps network 720) from the physical equipment. Within the present embodiment, the composite amount of capability 722 can include the combination of servers and CPUs of compute 716, amount of storage (e.g., GB) 718, and network speed (e.g., Mbps) 720), but is not limited to such.

Within FIG. 7, the Virtual Layer 712's utilization ratio 724 of consumed resources to physical resources determines the size and number of virtual machine (VM), storage, and network that the physical equipment can support which results in the virtual machine performance 726. For example, a utilization ratio 724 that deploys 6 virtual machines per physical server means that each VM is guaranteed at most ⅙ of the performance of 1 physical machine.

Based on the particular virtual machine size, virtual disk, and network configuration, the Appliance Layer 710 loads a software framework (e.g., middleware) 728 to create an appliance of type A with some capacity C (e.g., number of concurrent sessions, number of events processed in some time) 730. This capacity 730 is specific to the particulars of the virtual resource and the software framework.

Within FIG. 7, the Instantiation Layer 708 factors in the provider specific capacity limits 732 (e.g., contractual limits on the number of concurrent appliances, or the limit on the Mbps of network which limits the number of concurrent sessions) for the instance to produce provider specific performance 734. For example, the Instantiation Layer 708 connects appliance A instance with capacity 100 jobs per second, appliance B with 200 jobs per second then if appliances of type A and B are needed in serial the actual capacity is only 100 jobs per second.

Then the logic of Control Layer 706 combines these offered services with the demand to determine the number of appliances to connect to meet performance requirements (e.g., sourcing and scaling 736), and when to make those adjustments resulting in platform performance 738. For example, a number of machines N can be chosen so that the probability of finishing in the total amount of work in the prescribed time window is bounded. In the case with appliance A and B as above, the Control Logic 706 may monitor the actual number of jobs in the system. If the system reaches a threshold of 80 jobs, the Control Logic 706 responds with a request for the Instantiation Layer 708 to add another appliance of type A so that the system capacity is 200. The aggressiveness of the threshold and the response specify the platform performance that user demand is met.

Within FIG. 7, the Transformation Layer 704 specifies the SLAs 740 (e.g., capacity requirement) required to tune the aggressiveness of the Control Layer 706 and handles the preprocessing of the data or code may result in improving capacity conditions (or composite performance) 742. Ultimately the actions of the Transformation Layer 704 specify the capacity available with the performance guaranteed by the Control Layer 706's platform. For example, higher quality performance means that the Control Layer 706 needs to make sure there is always enough spare capacity. The threshold where new capacity is requested will be low so that the appliance instances in use are all lightly utilized. This capacity in terms of per user or per job estimates of application performance by dividing with an assumed number of users/jobs/events.

The user demand 744 at the Application Layer 702 drives overall performance 746. If resources run out due to incredibly high demand, then performance is low.

It is noted that the final characterization of attributes for a particular cloud-based implementation enables the comparison of these attributes against a variety of implementations.

FIG. 8 illustrates a cloud reference model 800 that includes attributes resulting from a specified implementation in accordance with an embodiment of the disclosure. Within the present embodiment, the implementation 816 for the physical layer 814 includes data center services of a RAID storage along with redundant failover of physical servers. In addition, the implementation 816 for the virtual layer 812 includes no virtual machine isolation. The implementation 816 for the appliance layer 810 includes load balancing and the implementation 816 for the instantiation layer 808 includes automated re-provisioning. Furthermore, the implementation 816 for the control layer 806 includes scaling across two regions and the implementation 816 for the transformation layer 804 includes job replication. The implementation 816 for the application layer 802 includes being 24 hours a day, 7 days a week.

Within the cloud reference model 800, the availability 818 for the physical layer 814 is 99.9 percent and the availability 818 for the virtual layer 812 is 99.9%. The availability 818 for the appliance layer 810 is 99.99% and the availability 818 for the instantiation layer 808 is 99.99%. Furthermore, the availability 818 for the control layer 806 is 99.999% and the availability 818 for the transformation layer 804 is 99.999%. The availability 818 for the application layer 802 is 99.999%.

Within FIG. 8, the associated cost 820 for the physical layer 814 is $40 per machine. In addition, the associated cost 820 for the virtual layer 812 is $40 per virtual machine. The associated cost 820 for the appliance layer 810 is $50 per appliance and the associated cost 820 for the instantiation layer 808 is $60 per instance. Additionally, the associated cost 820 for the control layer 806 is $120 per platform that supports a fixed SLA. The associated cost 820 for the transformation layer 804 is $130 per user. The associated cost 820 for the application layer 802 is $260 per month assuming two users.

Figure 9:
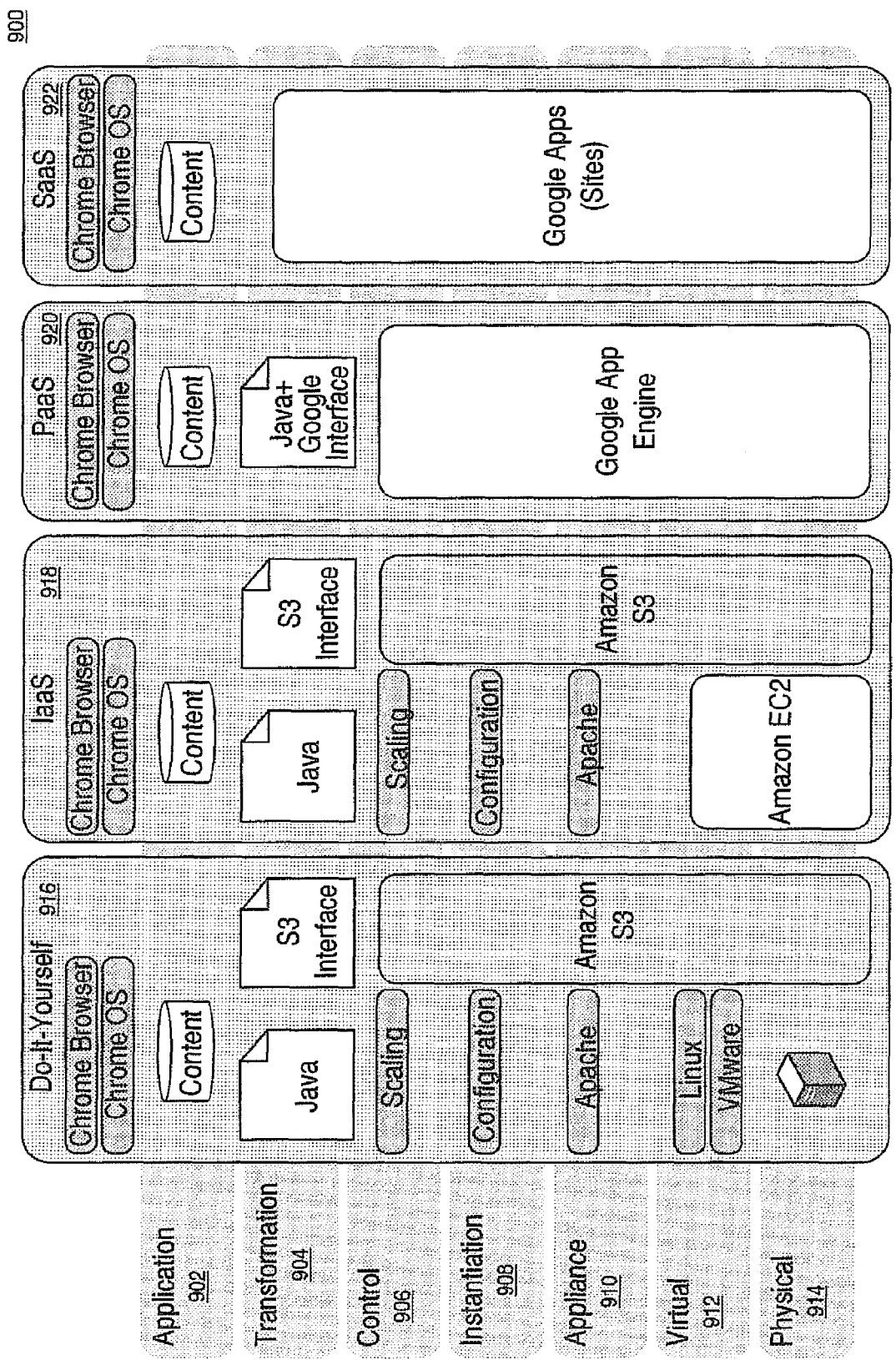
FIG. 9 shows the various components of various "as-a-Service" implementations in combination with a Cloud Reference Model in accordance with various embodiments of the disclosure.

FIG. 9 shows the various components of various "as-a-Service" implementations in combination with a Cloud Reference Model 900 in accordance with various embodiments of the disclosure. Within the present embodiment, four different examples are shown of "as-a-Service" implementations in combination with the Cloud Reference Model 900. Specifically, the "as-a-Service" implementations can include, but are not limited to, a Do-It-Yourself "as-a-Service" implementation 916, an Infrastructure-as-a-Service (IaaS) implementation 918, a Platform-as-a-Service (PaaS) implementation 920, and a Software-as-a-Service (SaaS) implementation 922. More than understanding the components in cloud-based architecture, it is noted that the Cloud Reference Model 900 can facilitate the evaluation of vendors and design attributes. Each layer of the cloud reference model 900 focuses concerns on one aspect of the overall design making it easier to characterize capability.

Note that conventional "as-a-Service" characterization of cloud providers fails to adequately categorize the architecture components. Consider Amazon which is characterized as Infrastructure-as-a-Service (IaaS). Amazon offerings include EC2 for virtual machines, Elastic Block Storage (EBS) for block level storage, and S3 for object level storage. Often, these offerings are all grouped as IaaS. However, the interface and the required solutions to work with EC2 and EBS are very different from those for S3.

For example, users submit objects for storage on S3 without visibility into the virtual machine appliances, their configuration, or the way they scale. Amazon handles these functions and the user accepts the composite storage platform's availability and access guarantees. Conversely with EC2 and EBS, these functions are the user's responsibility: At the Appliance Layer 910 to determine the middleware required to create the virtual appliance and the format of the EBS volume; at the Instantiation Layer 908 to add the provisioning scripts to configure the deployed appliances; and then at the Control Layer 906 to implement the algorithms or functions to scale the number of virtual appliances. For these efforts the user controls the implementation, the configuration, and the SLAs. In fact, in one embodiment, the user can create custom S3-type functionality from EC2 and EBS.

This comparison of Amazon services demonstrates two points: First, the need to characterize offerings and not service providers; and second, how the Cloud Reference Model 900 can expand the functionality of conventional "as-a-Service" characterization. Note that an IaaS offering can provide virtualized compute resources at the Virtual Layer 912. Then Platform-as-a-Service (PaaS) offerings provide the compute platform for execution of user-generated program. Since PaaS offerings include provider-determined specification of the virtual appliances, their instantiation, and their scaling, PaaS capability encompasses functionality at the Control Layer 906. And then Software-as-a-Service (SaaS) supplies programs at the Application Layer 902 like for Customer Relationship Management, E-mail, or SharePoint.

Within FIG. 9, notice that the "as-a-Service" offerings are vertically grouped so that the provider or vendor handles all the functionality of the layers below the offered solution (i.e., SaaS, PaaS, and IaaS solutions at the Application Layer 902, Control Layer 906, and Virtual Layer 912, respectively). Note that the implementation of the stack can be proprietary. As such, responsibilities of the lower layers are of no concern for the enterprise user, but the tradeoff is that the functionality cannot be customized or controlled.

It is noted that in one embodiment, mapping the "as-a-Service" characterization onto the layers of the Cloud Reference Model 900 aids in the understanding of vendor capabilities. The process identifies the interfaces into these vendor offerings, e.g., the enterprise end-user's responsibility to create scripts at the Transformation Layer 904 to interface with PaaS's solution starting from the Control Layer 906. When designing the system, the Cloud Reference Model 900 can be used to check that per-layer requirements are satisfied by vendor implementation.

Within FIG. 9, in accordance with various embodiments, a portal application is utilized to demonstrate how the Cloud Reference Model 900 helps evaluate what type of cloud to use for the desired amount of enterprise responsibility and control. For example, consider a wiki application that allows users to easily generate interlinked web pages by populating content. Users access and update the content via a web browser. Note that FIG. 9 shows the various components of various "as-a-Service" implementations in accordance with various embodiments of the disclosure.

In one embodiment, the Application Layer 902 adds the wiki program on top of web application architecture. For example, Google Sites offers a wiki application as part of Google Apps' SaaS offering. Google defines style sheets for users to create their own websites and manages user access and actions. If the functionality of Google Sites is sufficient, then nothing else needs to be done. Otherwise, further functionality can be implemented below the Application Layer 902.

Within FIG. 9, the user can provide the application program, e.g., a Java program. Then Transformation Layer 904 takes the application program and handles the platform-specific interfaces, e.g., Google App Engine-specific interfaces to load the program. It is noted that changing to a data center implementation can involve re-factoring those interfaces.

When using Google App Engines, the offered SLAs and the implementation can be acceptable. If these are unacceptable, then additional functionality can be implemented. Implementation of logic at the Control Layer 906 can determine the best possible sourcing in terms of the quantity and placement of the appliances and allows realization of custom attributes. For example, support 99.99% availability and a maximum of 500 ms round-trip-time.

Within FIG. 9, next the Instantiation Layer 908 can provision and manage the deployment specified by the Control Layer 906. Functions at the Instantiation Layer 908 can determine what configuration settings are applied. Additionally, the Instantiation Layer 908 can use APIs and scripts for each data center or cloud provider to set-up and configure the requested virtual machines. The Instantiation Layer 908 can also consolidate the monitoring across service providers that is passed back to the Control Layer 906. For these actions, service automation products in one embodiment may be leveraged like Rightscale or Appistry. It is pointed out that changes in these actions (e.g., update Amazon credentials) can result in a change in the script used at the Instantiation Layer 908 without impacting the Cloud Control Layer 906.

Then implementation at the Appliance Layer 910 can allow the user to control the middleware. For example in an embodiment, versions and details of the software framework itself like how load balancing occurs exist at the Appliance Layer 910. Furthermore, the Appliance Layer 910 can work with the Virtual Layer 912 to choose an underlying operating system (OS) and sizing of the virtual machine on top of which the appliance sits.

Within FIG. 9, it is pointed out that responsibility within the Virtual Layer 912 can enable control over how virtual resources are created. For example, the Virtual Layer 912 can enforce physical separation of certain virtual machines from other workloads. Oversight within the Physical Layer 914 can enforce physical guarantees around equipment capability (e.g., graphics processing units (CPUs), energy use, personnel, and location).

The Cloud Reference Model 900 can identify the necessary components for cloud architecture. The layered design of the Cloud Reference Model 900 can fit solutions together where each solution focuses on a subset of the overall functionality. This approach of the Cloud Reference Model 900 can add detail to conventional "as-a-Service" classification. The Cloud Reference Model 900 can point to key work-to-be-done. In addition, the logic of the Cloud Reference Model 900 can point to gaps that hinder enterprise-class cloud computing. Filling these gaps can involve joint effort between vendors, industry groups, and academia, but is not limited to such.

Figure 10:
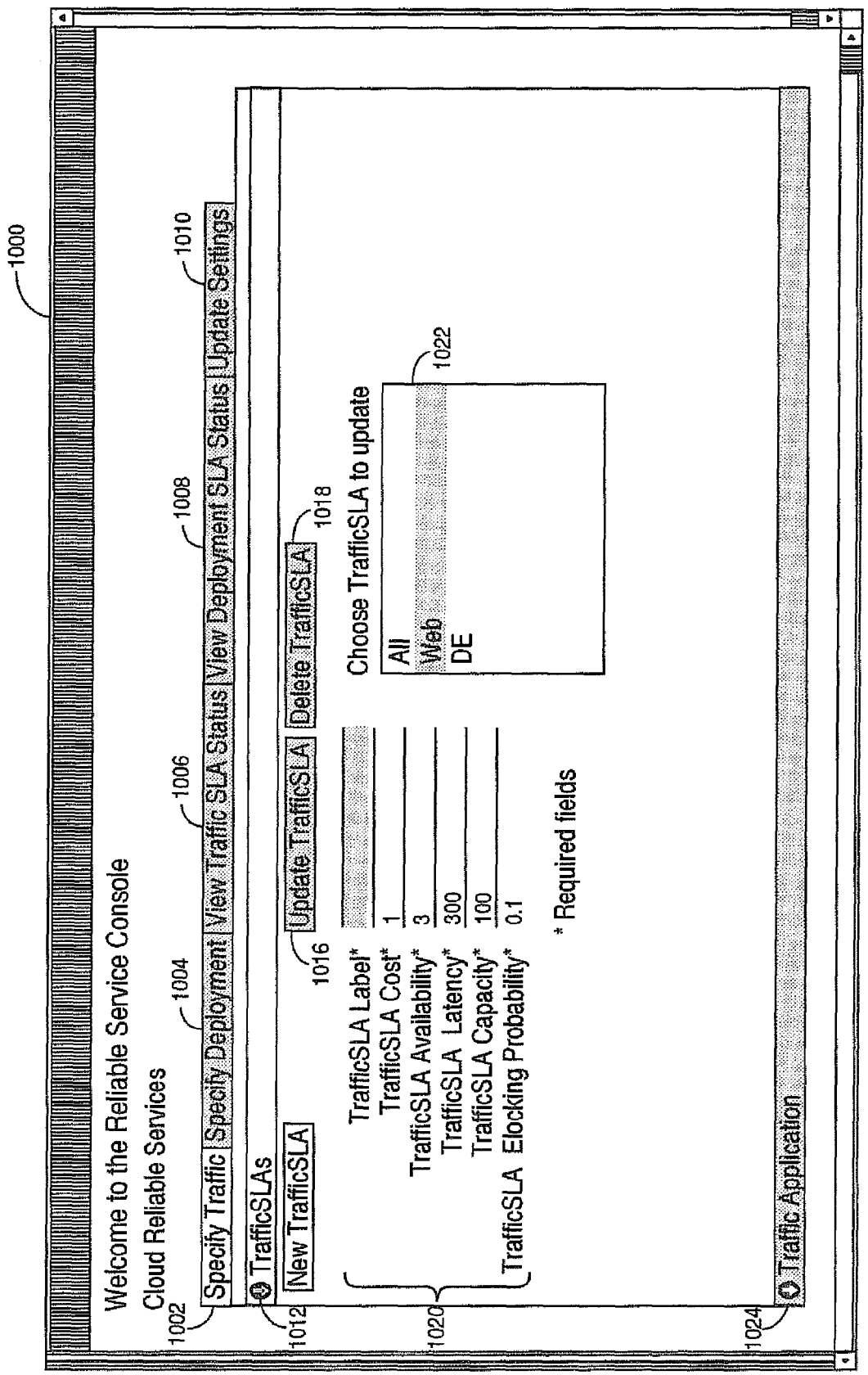
FIG. 10 is a user interface for configuring a cloud control layer in accordance with various embodiments of the disclosure.

FIG. 10 is a user interface 1000 for configuring the control layer 1004 in accordance with various embodiments of the disclosure. It is understood that a user can utilizes the user interface 1000 to input user specified bespoke (or indicated or requested) service level agreements (SLAs). Specifically, within the user interface 1000 of FIG. 10, the user can specify a series of desired service level agreements for a selected application. It is pointed out that in one embodiment the user interface 1000 can be implemented as a graphical user interface (GUI), but is not limited to such.

In one embodiment, the user interface 1000 can be implemented to include multiple tabs. For example within the present embodiment, the user interface 1000 can include a "Specify Traffic" tab 1002, a "Specify Deployment" tab 1004, a "View Traffic SLA Status" tab 1006, a "View Deployment SLA Status" tab 1008, and an "Update Settings" tab 1010, but is not limited such. Note that the "Specify Traffic" tab 1002 is shown selected within the user interface 1000. In addition, the example contents of the "Specify Traffic" tab 1002 can include, but is not limited to, a "TrafficSLAs" sub-tab 1012 and a "Traffic-Application" sub-tab 1024. It is noted that the "TrafficSLAs" sub-tab 1012 is shown selected and its example contents can include, but is not limited to, a "New TrafficSLA" activation button 1014, an "Update TrafficSLA" activation button 1016, and a "Delete TrafficSLA" activation button 1018.

Within FIG. 10, when a user selects the "Update TrafficSLA" activation button 1016, the "Choose TrafficSLA to update" selection area 1022 can be displayed thereby enabling the user to select the application he or she desires to update and/or view. For example, within the present embodiment of the "Choose TrafficSLA to update" selection area 1022, the user can select to update the service level agreements of "All" the applications, the "Web" application, or a "DB" application. Once an application is selected within the "Choose TrafficSLA to update" selection area 1022, one or more service level agreements can be displayed which can enable the user to update the one or more displayed service level agreements. For example within the present embodiment, when the Web application is selected within the "Choose TrafficSLA to update" selection area 1022 as indicated by the highlighting of the word "Web", one or more service level agreement fields 1020 can be displayed. Specifically, the one or more service level agreement fields 1020 can include, but are not limited to, a label, a cost, an availability, a latency, a capacity, and/or a blocking probability associated with the selected application or applications of the "Choose TrafficSLA to update" selection area 1022.

Note that the user interface 1000 may not include all of the elements illustrated by FIG. 10. Additionally, the user interface 1000 can be implemented to include one or more elements not illustrated by FIG. 10. It is pointed out that the user interface 1000 of FIG. 10 can be utilized or implemented in any manner similar to that described herein, but is not limited to such.

Figure 11:
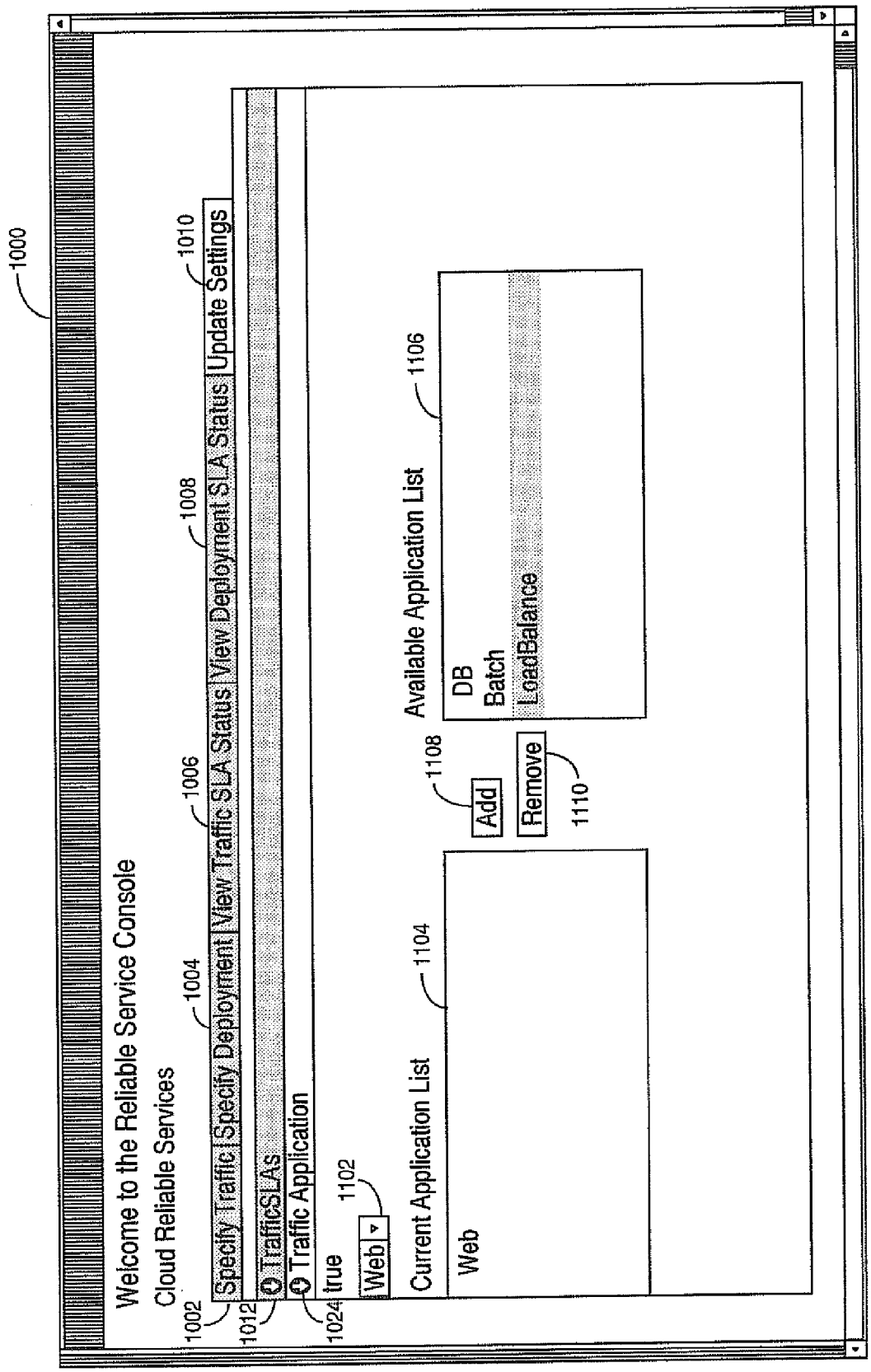
FIG. 11 illustrates both the "Specify Traffic" tab and the "Traffic-Application" sub-tab selected within the user interface in accordance with various embodiments of the disclosure.

FIG. 11 illustrates both the "Specify Traffic" tab 1002 and the "Traffic-Application" sub-tab 1024 selected within the user interface 1000 in accordance with various embodiments of the disclosure. It is pointed out that the contents of the Traffic-Application sub-tab 1024 can be utilized by a user to associate specific roles with a specified application.

Within the present embodiment, the example contents of the Traffic-Application sub-tab 1024 can include, but is not limited to, a role identifier drop-down menu selector 1102, a "Current Application List" display area 1104, an "Available Application List" display area 1106, an "Add" activation button 1108, and a "Remove" activation button 1110. It is pointed out that the role identifier drop-down menu selector 1102 can be utilized by a user to assign or associate one or more selected roles to a particular application. For instance within the present embodiment, the Web application listed within the Current Application List display area 1104 currently has a web role as indicated by the role identifier drop-down menu selector 1102.

Within FIG. 11, it is pointed out that if the Add activation button 1108 is selected by a user while the LoadBalance application is highlighted as shown within the Available Application List display area 1106, the LoadBalance application will be associated or assigned a web role while its label (or name or identifier) will be added to the Current Application List display area 1104. Note that the Remove activation button 1110 can be utilized by a user to remove and disassociate an application identifier from the Current Application List display area 1104. For example in an embodiment, after a user selects or highlights the identifier of an application listed within the Current Application List display area 1104, the Remove activation button 1110 is displayed active and usable while the Add activation button 1108 is displayed inactive and unusable. Thereafter, the user can select the Remove activation button 1110 resulting in the highlighted application identifier being removed from the Current Application List display area 1104. In addition, the removed application is disassociated or unassigned from its web role.

Figure 12:
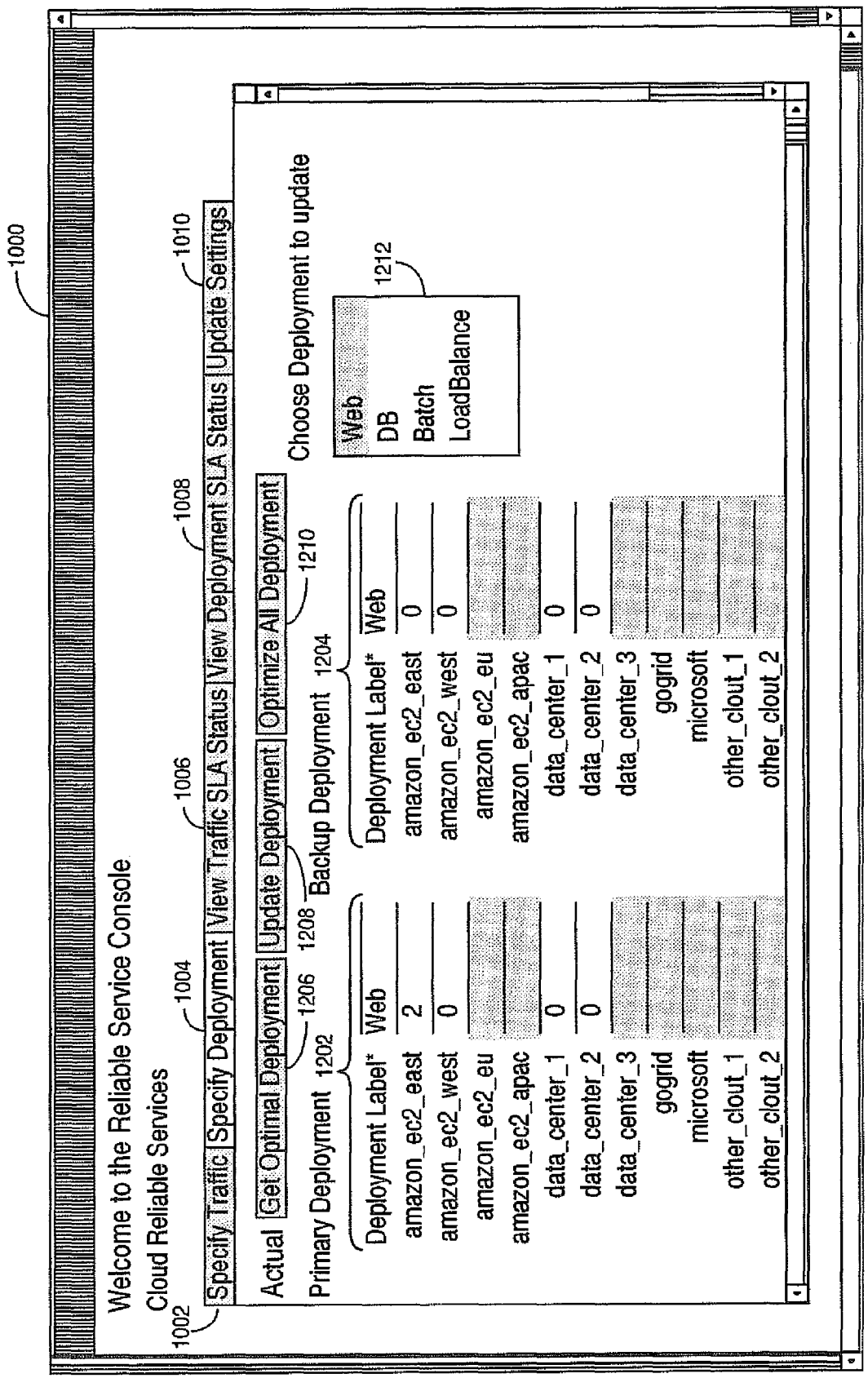
FIG. 12 illustrates the "Specify Deployment" tab selected within the user interface in accordance with various embodiments of the disclosure.

FIG. 12 illustrates the "Specify Deployment" tab 1004 selected within the user interface 1000 in accordance with various embodiments of the disclosure. The contents of the Specify Deployment tab 1004 can be utilized by a user to view and specify the primary deployment and backup deployment associated with one or more applications.

Within the present embodiment, the example contents of the Specify Deployment tab 1004 can include, but is not limited to, a "Get Optimal Deployment" activation button 1206, an "Update Deployment" activation button 1208, an "Optimize All Deployment" activation button 1210, a "Primary Deployment" information fields 1202, a "Backup Deployment" information fields 1204, and a "Choose Deployment to update" selection area 1212. It is pointed out that when the Update Deployment activation button 1208 is selected by a user, the user interface 1000 displays the "Choose Deployment to update" selection area 1212 along with the Primary Deployment information fields 1202 and Backup Deployment information fields 1204 that correspond to the highlighted application within the "Choose Deployment to update" selection area 1212.

Within FIG. 12, note that the "Choose Deployment to update" selection area 1212 can be utilized by a user to select a particular application to update and/or view its corresponding primary deployment and backup deployment. For example within the present embodiment, the Web application label is highlighted or selected within the "Choose Deployment to update" selection area 1212 thereby resulting in the display of its corresponding Primary Deployment information fields 1202 and Backup Deployment information fields 1204. It is noted that the grayed out provider fields shown within the Primary Deployment information fields 1202 and the Backup Deployment information fields 1204 have been filtered out by the control layer 1004.

It is pointed out that if the Optimize All Deployment activation button 1210 is selected by a user, the user interface 1000 applies the optimum (e.g., minimum cost) deployment that satisfies the service level agreements. Additionally, if the Get Optimal Deployment activation button 1206 is selected by a user, the user interface 1000 determines and highlights the application listed within the "Choose Deployment to update" selection area 1212 that currently has the optimal (e.g., minimum cost) deployment.

Figure 13:
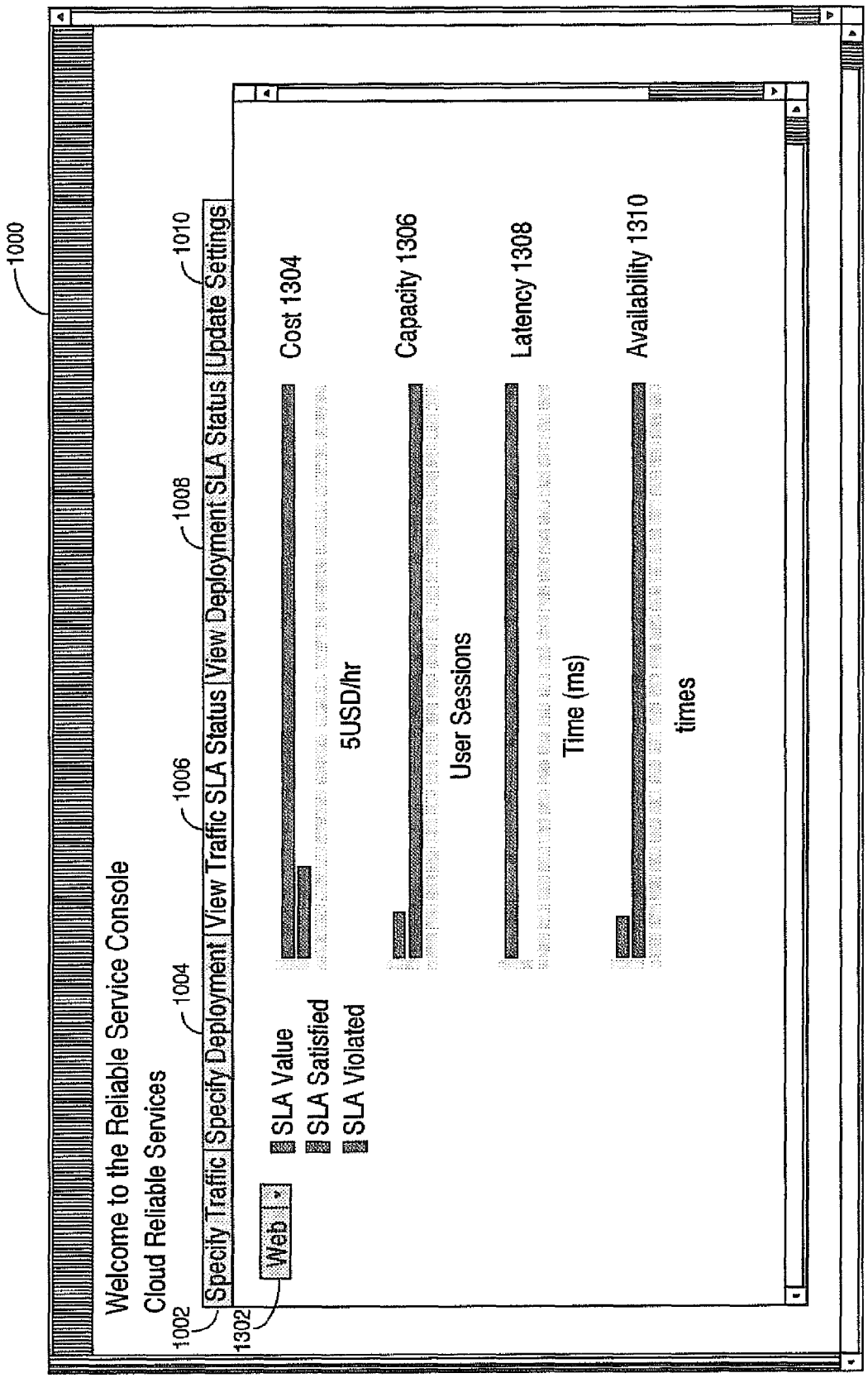
FIG. 13 illustrates the "View Traffic SLA Status" tab selected within the user interface in accordance with various embodiments of the disclosure.

FIG. 13 illustrates the "View Traffic SLA Status" tab 1006 selected within the user interface 1000 in accordance with various embodiments of the disclosure. The contents of the "View Traffic SLA Status" tab 1006 can be utilized by a user to view composite application service level agreements (SLAs) that include the actual (or measured) application service level agreements (based on deployed) along with the user specified application service level applications.

Within the present embodiment, the example contents of the "View Traffic SLA Status" tab 1006 can include, but is not limited to, an application identifier drop-down menu selector 1302, a Cost graph 1304, a Capacity graph 1306, a Latency graph 1308, and an Availability graph 1310. It is noted that the application identifier drop-down menu selector 1302 can be utilized by a user to select which composite application service level agreements to view. For example within the present embodiment, the "Web" application is currently selected within the application identifier drop-down menu selector 1302. As such, the Cost graph 1304, Capacity graph 1306, Latency graph 1308, and Availability graph 1310 display the composite service level agreements for the Web application.

Specifically within FIG. 13, it is pointed out that the black bar shown within each of the Cost graph 1304, Capacity graph 1306, Latency graph 1308, and Availability graph 1310 represents the user defined application service level agreement value while the gray bar within each graph represents the actual or measured service level agreements based on deployed cloud components. More specifically, the X-axis of the Cost graph 1304 represents the United States Dollars (USD) per hour (hr) service level agreement while the X-axis of the Capacity graph 1306 represents the capacity for user sessions service level agreement. Furthermore, the X-axis of the Latency graph 1308 represents the latency in milliseconds (ms) service level agreement while the X-axis of the Availability graph 1310 represents the percent of time the application is available (e.g., 99.999% of the time) service level agreement.

Figure 14:
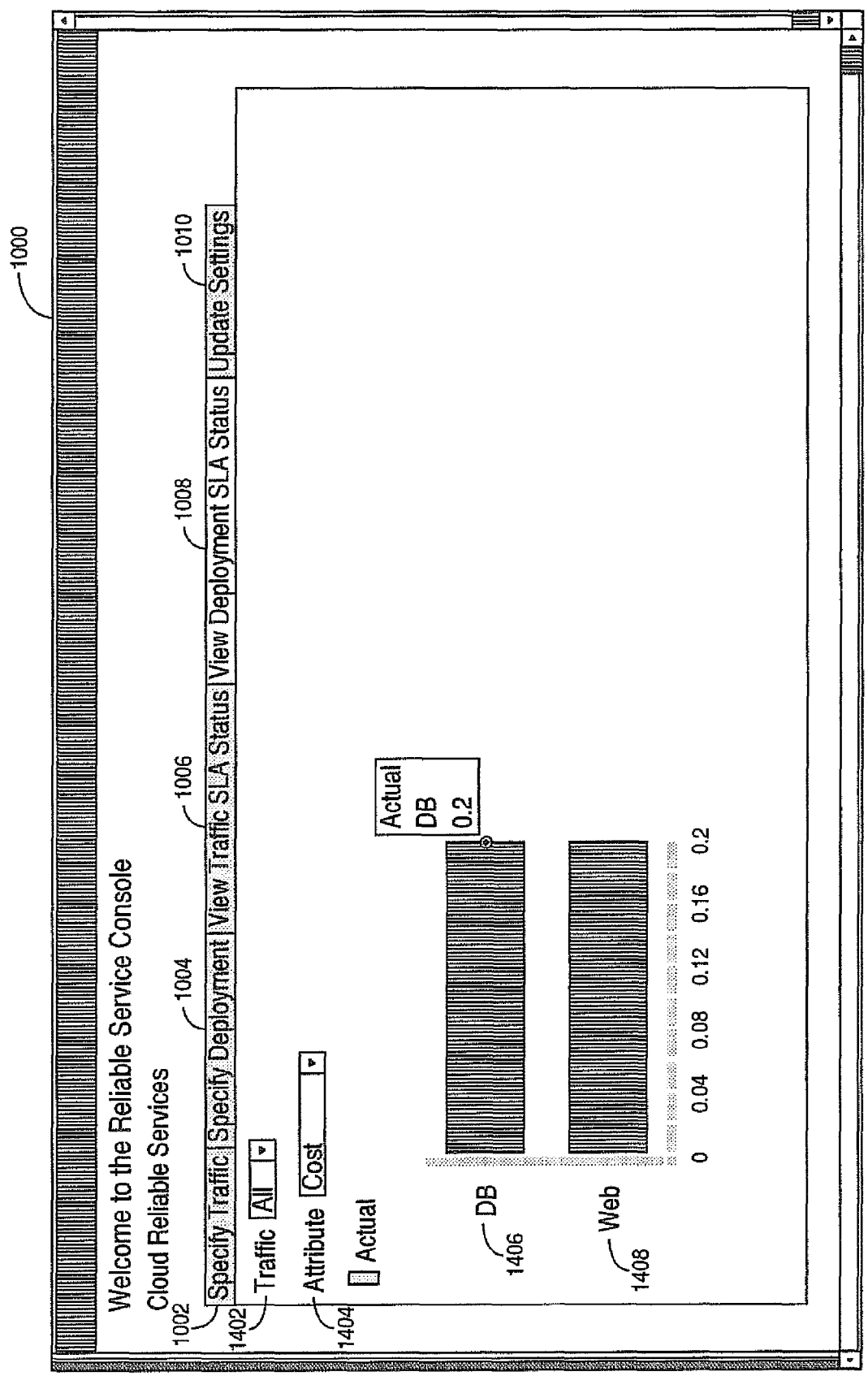
FIG. 14 illustrates the "View Deployment SLA Status" tab selected within the user interface in accordance with various embodiments of the disclosure.

FIG. 14 illustrates the "View Deployment SLA Status" tab 1008 selected within the user interface 1000 in accordance with various embodiments of the disclosure. The contents of the "View Deployment SLA Status" tab 1008 can be utilized by a user to view how a specific application service level agreement (SLA) can be split or divided up by role.

Within the present embodiment, the example contents of the "View Deployment SLA Status" tab 1008 can include, but is not limited to, an application identifier drop-down menu selector 1402, a service level agreement attribute drop-down menu selector 1404, a first role graph 1406, and a second role graph 1408. Note that the application identifier drop-down menu selector 1402 can be utilized by a user to select which application service level agreements to view. In addition, the service level agreement attribute drop-down menu selector 1404 can be utilized by the user to select which service level agreement attribute to view of the selected application.

Within the present embodiment of FIG. 14, it is pointed out that the "All" application is currently selected with the application identifier drop-down menu selector 1402. Furthermore, the service level agreement attribute drop-down menu selector 1404 is currently selected to the "Cost" attribute. Given the above user selections within the present embodiment, the user interface 1400 displays the "DB" role graph 1406 and the "Web" role graph 1408 which illustrate that the cost of the "All" application is split between the "DB" role and the "Web" role.

Figure 15:
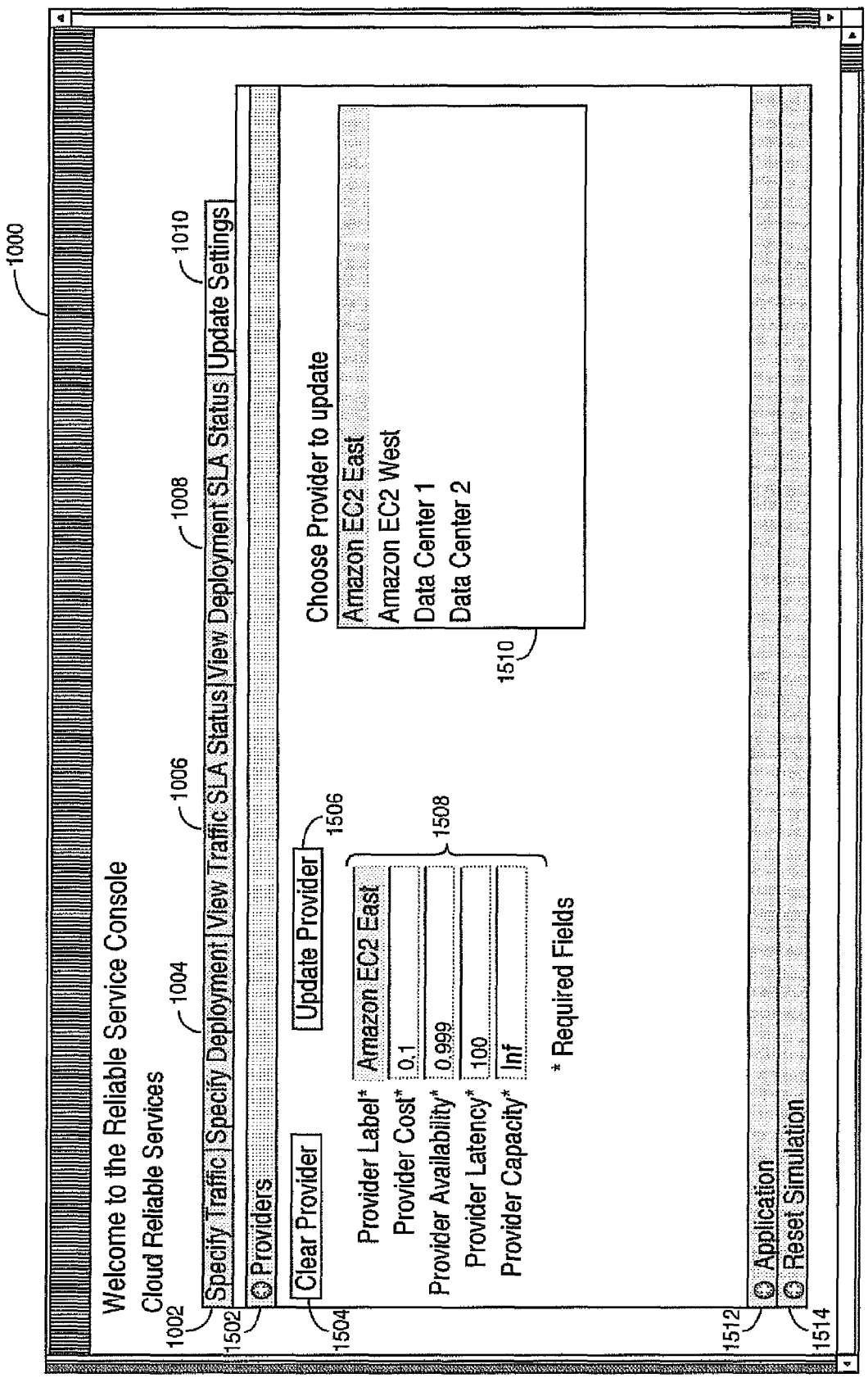
FIG. 15 illustrates the "Update Settings" tab selected within the user interface in accordance with various embodiments of the disclosure.

FIG. 15 illustrates the "Update Settings" tab 1010 selected within the user interface 1000 in accordance with various embodiments of the disclosure. Note that the contents of the "Update Settings" tab 1010 can be utilized by a user to update and view one or more settings associated with one or more cloud providers, one or more applications, and resetting a simulation, but is not limited to such.

Specifically within the present embodiment, the contents of the "Update Settings" tab 1010 includes, but is not limited to, a "Providers" sub-tab 1502, an "Application" sub-tab 1512, and a "Reset Simulation" sub-tab 1514. It is noted that the "Providers" sub-tab 1502 is shown selected thereby enabling a user to update and view one or more settings associated with one or more cloud providers. The example contents of the "Providers" sub-tab 1502 can include, but is not limited to, a "Clear Provider" activation button 1504, an "Update Provider" activation button 1506, a "Choose Provider to update" selection area 1510, and Cloud Provider information fields 1508.

Within FIG. 15, it is pointed out that when the "Update Provider" activation button 1506 is selected by a user, the user interface 1000 can display the "Choose Provider to update" selection area 1510 along with one or more Cloud Provider information fields 1508 that correspond to the highlighted or selected provider within the "Choose Provider to update" selection area 1510. In one embodiment, the Cloud Provider information fields 1508 can include, but are not limited to, a provider label field, a provider cost field, a provider availability field, a provider latency field, and a provider capacity field. It is noted that the metrics of a provider shown within the Cloud Provider information fields 1508 can be obtained either via estimated values from actual measurements of the provider or from published (or known) values, but is not limited to such.

Figure 16:
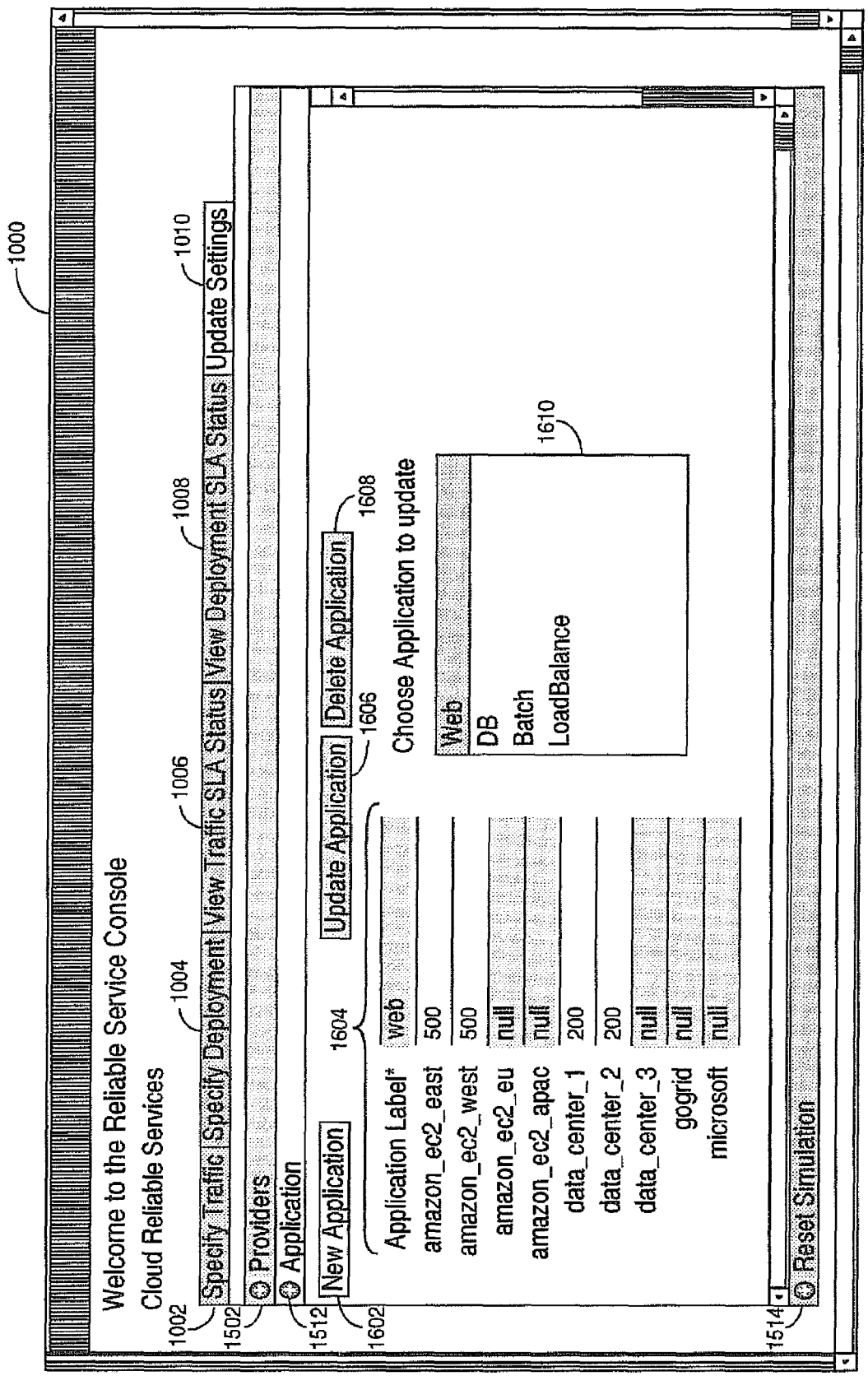
FIG. 16 illustrates both the "Update Settings" tab and the "Application" sub-tab selected within the user interface in accordance with various embodiments of the disclosure.

FIG. 16 illustrates both the "Update Settings" tab 1010 and the "Application" sub-tab 1512 selected within the user interface 1000 in accordance with various embodiments of the disclosure. It is pointed out that the contents of the "Application" sub-tab 1512 can be utilized by a user to update and view one or more settings of a specified cloud application, delete an existing cloud application, and add a new cloud application along with its corresponding settings, but is not limited to such.

Within the present embodiment, the example contents of the "Application" sub-tab 1512 can include, but is not limited to, a "New Application" activation button 1602, an "Update Application" activation button 1606, and a "Delete Application" activation button 1608. Note that when a user selects the "Update Application" activation button 1606, a "Choose Application to update" selection area 1610 can be displayed thereby enabling the user to select the application settings he or she desires to update and/or view. For example, within the present embodiment of the "Choose Application to update" selection area 1610, the user can to update the settings of the "Web" application, the "DB" application, a "Batch" application, or a "LoadBalance" application. Once an application is selected within the "Choose Application to update" selection area 1610, one or more application provider capacity fields 1604 can be displayed thereby enabling the user to view and/or update one or more of them. It is noted that the capacity of a provider may be updated utilizing either estimated values from actual measurements of the provider or from published (or known) values, but is not limited to such.

Specifically within the present embodiment of FIG. 16, when the "Web" application is selected within the "Choose Application to update" selection area 1610 as indicated by the highlighting of the word "Web", one or more provider capacity fields 1604 corresponding to the "Web" application can be displayed by the user interface 1000. For example in one embodiment, the "Web" application has a capacity of 500 sessions for the "amazon_ec2_east" provider, a capacity of 500 sessions for the "amazon_ec2_wast" provider, a capacity of 200 sessions for the "data_center_1" provider, and a capacity of 200 sessions for the "data_center_2" provider. It is pointed out that the grayed out provider fields shown within the provider capacity fields 1604 have been filtered out by the control layer 104.

Note that the user interface 1000 may not include all of the elements illustrated by FIGS. 10-16. Moreover, the user interface 1000 can be implemented to include one or more elements not illustrated by FIGS. 10-16. It is pointed out that the user interface 1000 of FIGS. 10-16 can be utilized or implemented in any manner similar to that described herein, but is not limited to such.

Figure 17:
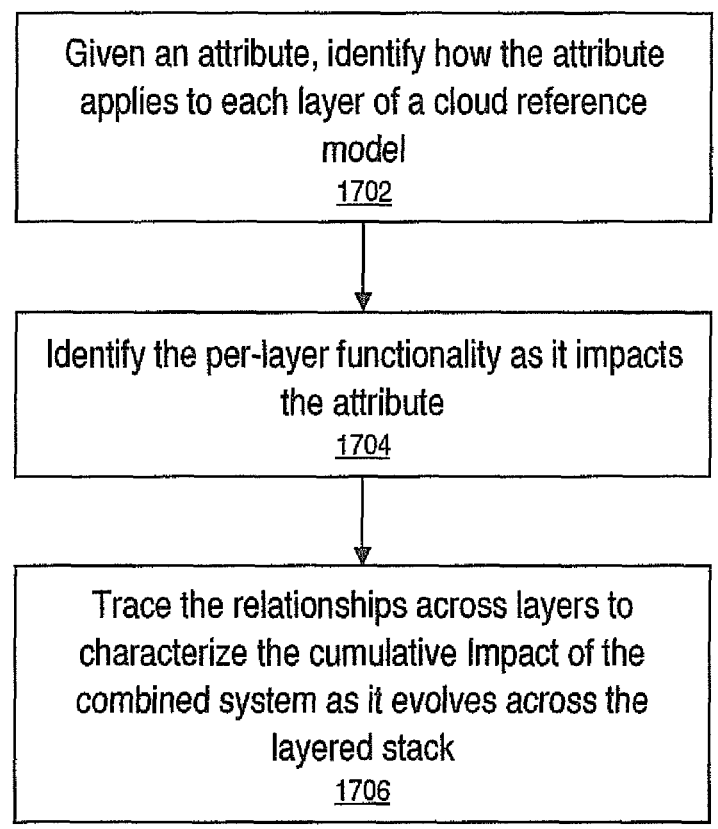
FIG. 17 is a flow diagram in accordance with various embodiments of the disclosure.

FIG. 17 is a flow diagram of a method 1700 in accordance with various embodiments of the disclosure for performing an analysis of cloud based architectures by using a cloud reference model (e.g., 100). Although specific operations are disclosed in flow diagram 1700, such operations are examples. Method 1700 may not include all of the operations illustrated by FIG. 17. Also, method 1700 may include various other operations and/or variations of the operations shown by FIG. 17. Likewise, the sequence of the operations of flow diagram 1700 can be modified. It is appreciated that not all of the operations in flow diagram 1700 may be performed. In various embodiments, one or more of the operations of method 1700 can be performed by software, by firmware, by hardware, or by any combination thereof, but is not limited to such. Method 1700 can include processes of embodiments which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

At operation 1702 of FIG. 17, given an attribute, method 1700 can identify how the attribute applies to each layer of a cloud reference model (e.g., 100). It is noted that operation 1702 can be implemented in a wide variety of ways. For example in one embodiment, the attribute at operation 1702 can be defined as, but is not limited to, security, cost, availability, carbon footprint, performance. Note that operation 1702 can be implemented in any manner similar to that described herein, but is not limited to such.

At operation 1704, the per-layer functionality of the cloud reference model can be identified as it impacts the given attribute. It is pointed out that operation 1704 can be implemented in a wide variety of ways. For example in an embodiment, the per-layer functionality at operation 1704 can include, but is not limited to, one or more IT capabilities. It is noted that operation 1704 can be implemented in any manner similar to that described herein, but is not limited to such.

At operation 1706 of FIG. 17, relationships can be traced across the layers of the cloud reference model to characterize the cumulative impact of the combined system as it evolves across the layered stack. Note that operation 1706 can be implemented in a wide variety of ways. For example, operation 1706 can be implemented in any manner similar to that described herein, but is not limited to such.

Figure 18:
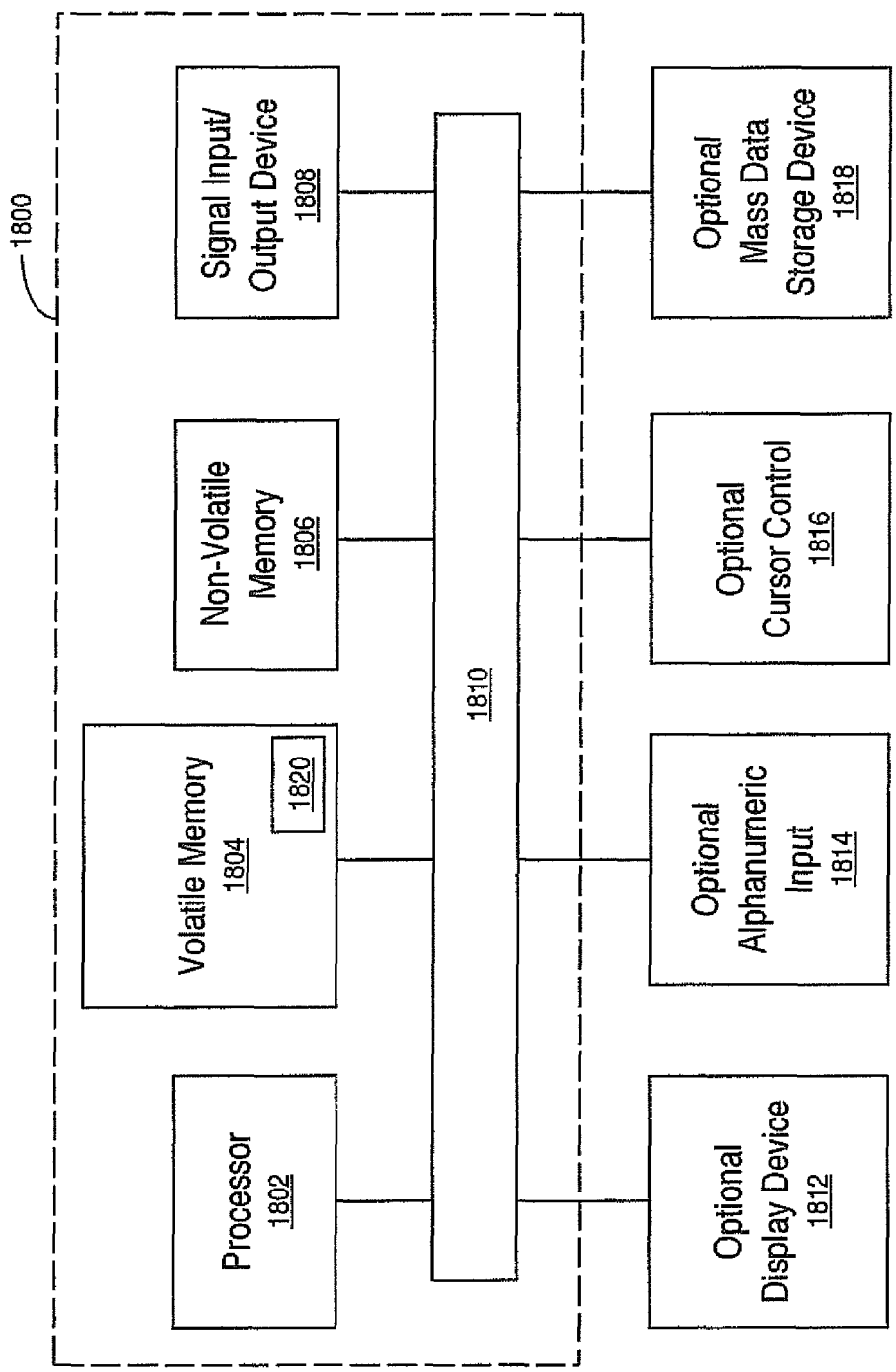
FIG. 18 is a block diagram of an exemplary computing system that may be used in accordance with various embodiments of the disclosure.

FIG. 18 is a block diagram of an exemplary computing system 1800 that may be used in accordance with various embodiments of the disclosure. It is understood that system 1800 is not strictly limited to be a computing system. As such, system 1800 is well suited to be any type of computing device (e.g., server, desktop computer, laptop computer, portable computing device, database computer system, handheld computing device, etc.) in accordance with various embodiments of the disclosure. In its various implementations, system 1800 may not include all of the elements illustrated by FIG. 18, or system 1800 may include other elements not shown by FIG. 18. Within discussions of various embodiments in accordance with the disclosure herein, certain processes and operations are discussed that can be realized, in some embodiments, as a series of instructions (e.g., software program, modules, and the like) that reside within computer readable memory or storage of computing system 1800 and executed by a processor(s) of system 1800. When executed, the instructions can cause computer 1800 to perform specific operations and exhibit specific behavior which are described herein, but are not limited to such.

Computer system 1800 can include an address/data bus 1810 for communicating information, one or more central processors 1802 coupled with bus 1810 for processing information and instructions. Central processor unit(s) 1802 may be a microprocessor or any other type of processor. The computer 1800 can also include data storage features such as computer usable volatile memory 1804, e.g., random access memory (RAM), static RAM, dynamic RAM, etc., coupled with bus 1810 for storing information and instructions for central processor(s) 1802, computer usable non-volatile memory 1806, e.g., read only memory (ROM), programmable ROM, flash memory, erasable programmable read only memory (EPROM), electrically erasable programmable read only memory (EEPROM), etc., coupled with bus 1810 for storing static information and instructions for processor(s) 1802.

System 1800 of FIG. 18 can also include one or more signal generating and receiving devices 1808 coupled with bus 1810 for enabling system 1800 to interface with other electronic devices. The communication interface(s) 1808 of the present embodiment may include wired and/or wireless communication technologies. For example in one embodiment, the communication interface 1808 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In an embodiment, a cable or digital subscriber line (DSL) connection may be employed. In such a case the communication interface(s) 1808 may include a cable modem or a DSL modem.

Optionally, computer system 1800 can include an alphanumeric input device 1814 including alphanumeric and function keys coupled to the bus 1810 for communicating information and command selections to the central processor(s) 1802. The computer 1800 can also include an optional cursor control or cursor directing device 1816 coupled to the bus 1810 for communicating user input information and command selections to the processor(s) 1802. The cursor directing device 1816 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 1814 using special keys and key sequence commands. The present embodiment is also well suited to directing a cursor by other means such as, for example, voice commands.

Within FIG. 18, the system 1800 can also include an optional computer usable mass data storage device 1818 such as a magnetic or optical disk and disk drive (e.g., hard drive or floppy diskette) coupled with bus 1810 for storing information and instructions. The system 1800 can include an optional display device 1812 coupled to bus 1810 for displaying video and/or graphics. Note that the optional display device 1812 may be implemented with different technologies. For example, the optional display device 1812 may be implemented with, but is not limited to, a cathode ray tube (CRT), flat panel liquid crystal display (LCD), field emission display (FED), plasma display, light emitting diode (LED) display, or any other display device suitable for displaying video and/or graphic images and alphanumeric characters recognizable to a user.

Note that the volatile memory 1804 may store a cloud management system or module 1820 in accordance with various embodiments of the disclosure. The cloud management system or module 1820 may include instructions to cause the system 1800 to operate or function in any manner similar to that described herein, but not limited to such. It is pointed out that in various embodiments, the cloud management system or module 1820 (or one or more of its components) may be stored by the volatile memory 1804, or the non-volatile memory 1806, or the mass data storage device 1818, or any combination thereof. In various embodiments, the cloud management system or module 1820 can be an implementation of the cloud management system or module 100 of FIG. 1 or the cloud management system or module 200 of FIG. 2, but is not limited to such.

Within FIG. 18, it is noted that the components associated with system 1800 described above may be resident to and associated with one physical computing device. However, one or more of the components associated with system 1800 may be physically distributed to other locations and be communicatively coupled together (e.g., via one or more networks).

Note that the system 1800 may not include all of the elements illustrated by FIG. 18. Furthermore, the system 1800 can be implemented to include one or more elements not illustrated by FIG. 18. It is pointed out that the system 1800 can be utilized or implemented in any manner similar to that described herein, but is not limited to such.

The foregoing descriptions of various specific embodiments in accordance with the disclosure have been presented for purposes of illustration and description. They are not intended to be exhaustive or to limit the disclosure to the precise forms disclosed, and many modifications and variations are possible in light of the above teaching.

What is claimed is:

1. A computer-implemented method of providing an application architecture, comprising:
    generating, by one or more processors, a plurality of layers of the application architecture, each of the plurality of layers having different functionalities and being configured to perform respective operations;
    receiving, at an application layer of the plurality of layers, and by the one or more processors, a user input comprising data that specifies a functionality of the application architecture;
    selecting, at a transformation layer of the plurality of layers, and by the one or more processors, a computing platform having a capability to provide the functionality of the application architecture;
    transforming, at the transformation layer of the plurality of layers, and by the one or more processors, the data to platform-specific content that is compatible with the computing platform;
    selecting, at a control layer of the plurality of layers, and by the one or more processors, one or more vendors to provide one or more virtual machines that are appropriate for provisioning of the computing platform;
    generating, at a virtualization layer of the plurality of layers, and by the one or more processors, the one or more virtual machines based on outputs provided by an instantiation layer and an appliance layer of the plurality of layers and based on one or more physical resources that are maintained at a physical layer of the plurality of layers and that support computing operations; and
    provisioning, by the one or more processors, the computing platform on the one or more virtual machines based on specifications of the one or more vendors.

2. The computer-implemented method of claim 1, wherein the application architecture is a cloud-based application architecture.

3. The computer-implemented method of claim 1, wherein a functionality of each layer of the plurality of layers can be fulfilled by combining functionalities from adjacent layers of the plurality of layers.

4. The computer-implemented method of claim 1, further comprising determining the different functionalities of the plurality of layers based on a particular attribute.

5. The computer-implemented method of claim 4, wherein the particular attribute comprises a security attribute, an availability attribute, a cost attribute, a carbon footprint attribute, or a performance attribute.

6. The computer-implemented method of claim 4, wherein the particular attribute varies across the plurality of layers based on a functionality of each layer.

7. The computer-implemented method of claim 4, further comprising characterizing the application architecture by combining the different functionalities of the plurality of layers.

8. The computer-implemented method of claim 7, further comprising characterizing a cumulative result of the particular attribute by tracing relationships across the plurality of layers.

9. The computer-implemented method of claim 1, wherein the application architecture is provided as an As-a-Service implementation.

10. The computer-implemented method of claim 1, wherein the data further specifies an end-user experience of the application architecture.

11. The computer-implemented method of claim 1, wherein transforming the data to platform-specific content comprises one or more of encrypting data, encoding data for error correction, segmenting large data objects into smaller units, reformatting data structures into XML, and applying business logic to structure data.

12. The computer-implemented method of claim 1, further comprising selecting one or more of quantities, types, and locations of the one or more virtual machines for provisioning the computing platform.

13. The computer-implemented method of claim 1, further comprising monitoring a status of the computing platform for determining how to meet guarantees related to one or more of service-level agreements, compliance, cost, and capability.

14. The computer-implemented method of claim 1, further comprising adding middle-ware to the one or more virtual machines.

15. The computer-implemented method of claim 1, wherein generating the one or more virtual machines comprises assigning the one or more virtual machines to the one or more physical devices.

16. The computer-implemented method of claim 1, wherein the one or more physical resources comprise one or more of IT hardware, storage, network-attached storage, networks, and data centers.

17. The computer-implemented method of claim 1, wherein the one or more vendors are selected based on locational preferences.

18. The computer-implemented method of claim 1, wherein the one or more vendors are selected based on one or more constraints comprising cost, compliance, and capability.

19. A non-transitory computer-readable storage medium coupled to one or more processors and having instructions stored thereon which, when executed by the one or more processors, cause the one or more processors to perform operations for providing an application architecture, the operations comprising:
generating a plurality of layers of the application architecture, each of the plurality of layers having different functionalities and being configured to perform respective operations;
receiving, at an application layer of the plurality of layers, a user input comprising data that specifies a functionality of the application architecture;
selecting, at a transformation layer of the plurality of layers, a computing platform having a capability to provide the functionality of the application architecture;
transforming, at the transformation layer of the plurality of layers, the data to platform-specific content that is compatible with the computing platform;
selecting, at a control layer of the plurality of layers, one or more vendors to provide one or more virtual machines that are appropriate for provisioning of the computing platform;
generating, at a virtualization layer of the plurality of layers, the one or more virtual machines based on outputs provided by an instantiation layer and an appliance layer of the plurality of layers and based on one or more physical resources that are maintained at a physical layer of the plurality of layers and that support computing operations; and
provisioning the computing platform on the one or more virtual machines based on specifications of the one or more vendors.

20. A system, comprising:
one or more processors; and
a computer-readable storage device coupled to the one or more processors and having instructions stored thereon which, when executed by the one or more processors, cause the one or more processors to perform operations for providing an application architecture, the operations comprising:
generating a plurality of layers of the application architecture, each of the plurality of layers having being configured to perform respective operations;
receiving, at an application layer of the plurality of layers, a user input comprising data that specifies a functionality of the application architecture;
selecting, at a transformation layer of the plurality of layers, a computing platform having a capability to provide the functionality of the application architecture;
transforming, at the transformation layer of the plurality of layers, the data to platform-specific content that is compatible with the computing platform;
selecting, at a control layer of the plurality of layers, one or more vendors to provide one or more virtual machines that are appropriate for provisioning of the computing platform;
generating, at a virtualization layer of the plurality of layers, the one or more virtual machines based on outputs provided by an instantiation layer and an appliance layer of the plurality of layers and based on one or more physical resources that are maintained at a physical layer of the plurality of layers and that support computing operations; and
provisioning the computing platform on the one or more virtual machines based on specifications of the one or more vendors.

21. A computer-implemented method of providing an application architecture, comprising:
generating, by one or more processors, a plurality of layers of the application architecture, each of the plurality of layers having different functionalities and being configured to perform respective operations;
determining, by the one or more processors, the different functionalities of the plurality of layers based on a particular attribute;
characterizing, by the one or more processors, the application architecture by combining the different functionalities of the plurality of layers; and
characterizing, by the one or more processors, a cumulative result of the particular attribute by tracing relationships across the plurality of layers, the plurality of layers being configured to perform operations comprising:
receiving, by the one or more processors, a user input comprising data that specifies a functionality of the application architecture, selecting, by the one or more processors, a computing platform having a capability to provide the functionality of the application architecture, transforming, by the one or more processors, the data to platform-specific content that is compatible with the computing platform, selecting, by the one or more processors, one or more vendors to provide one or more virtual machines that are appropriate for provisioning of the computing platform, generating, by the one or more processors, the one or more virtual machines based on one or more physical resources that support computing operations, and provisioning, by the one or more processors, the computing platform on the one or more virtual machines based on specifications of the one or more vendors.

22. A non-transitory computer-readable storage medium coupled to one or more processors and having instructions stored thereon which, when executed by the one or more processors, cause the one or more processors to perform operations for providing an application architecture, the operations comprising:

generating a plurality of layers of the application architecture, each of the plurality of layers having different functionalities and being configured to perform respective operations;

determining the different functionalities of the plurality of layers based on a particular attribute;

characterizing the application architecture by combining the different functionalities of the plurality of layers; and characterizing a cumulative result of the particular attribute by tracing relationships across the plurality of layers, the plurality of layers being configured to perform further operations comprising:

receiving a user input comprising data that specifies a functionality of the application architecture, selecting a computing platform having a capability to provide the functionality of the application architecture, transforming the data to platform-specific content that is compatible with the computing platform, selecting one or more vendors to provide one or more virtual machines that are appropriate for provisioning of the computing platform, generating the one or more virtual machines based on one or more physical resources that support computing operations, and provisioning the computing platform on the one or more virtual machines based on specifications of the one or more vendors.

23. A system, comprising:

one or more processors; and a computer-readable storage device coupled to the one or more processors and having instructions stored thereon which, when executed by the one or more processors, cause the one or more processors to perform operations for providing an application architecture, the operations comprising:

generating a plurality of layers of the application architecture, each of the plurality of layers having different functionalities and being configured to perform respective operations;

determining the different functionalities of the plurality of layers based on a particular attribute;

characterizing the application architecture by combining the different functionalities of the plurality of layers; and characterizing a cumulative result of the particular attribute by tracing relationships across the plurality of layers, the plurality of layers being configured to perform further operations comprising:

receiving a user input comprising data that specifies a functionality of the application architecture, selecting a computing platform having a capability to provide the functionality of the application architecture, transforming the data to platform-specific content that is compatible with the computing platform, selecting one or more vendors to provide one or more virtual machines that are appropriate for provisioning of the computing platform, generating the one or more virtual machines based on one or more physical resources that support computing operations, and provisioning the computing platform on the one or more virtual machines based on specifications of the one or more vendors.

* * * * *